United States Patent
Hannuksela et al.

(10) Patent No.: US 10,244,257 B2
(45) Date of Patent: Mar. 26, 2019

(54) VIDEO CODING AND DECODING

(75) Inventors: Miska Matias Hannuksela, Ruutana (FI); Dmytro Rusanovskyy, Lempaala (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 748 days.

(21) Appl. No.: 13/600,228

(22) Filed: Aug. 31, 2012

(65) Prior Publication Data

US 2013/0235152 A1 Sep. 12, 2013

Related U.S. Application Data

(60) Provisional application No. 61/529,456, filed on Aug. 31, 2011.

(51) Int. Cl.
*H04N 19/597* (2014.01)
*H04N 19/70* (2014.01)
*H04N 19/114* (2014.01)

(52) U.S. Cl.
CPC ......... *H04N 19/597* (2014.11); *H04N 19/114* (2014.11); *H04N 19/70* (2014.11)

(58) Field of Classification Search
CPC .... H04N 19/70; H04N 19/597; H04N 19/114; H04N 19/00769
See application file for complete search history.

(56) References Cited

U.S. PATENT DOCUMENTS

| 8,457,155 B2 | 6/2013 | Hannuksela |
| 2008/0089428 A1 | 4/2008 | Nakamura et al. |
| 2008/0089596 A1* | 4/2008 | Choi ............... H04N 19/597 382/238 |
| 2008/0253671 A1 | 10/2008 | Choi et al. |
| 2009/0268816 A1* | 10/2009 | Pandit ............... H04N 19/597 375/240.12 |
| 2009/0323824 A1* | 12/2009 | Pandit ............... H04N 21/2365 375/240.26 |
| 2012/0269275 A1* | 10/2012 | Hannuksela ......... 375/240.25 |

(Continued)

FOREIGN PATENT DOCUMENTS

| CN | 101523914 A | 9/2009 |
| KR | 2007-0111880 A | 11/2007 |
| WO | 2008/008133 A2 | 1/2008 |

OTHER PUBLICATIONS

Schierl et al. ("Transport and Storage Systems for 3-D Video Using MPEG-2 Systems, RTP, and ISO File Format," Proceedings of the IEEE, vol. 99, No. 4, pp. 671,683, Apr. 2011).*

(Continued)

*Primary Examiner* — Maria E Vazquez Colon
(74) *Attorney, Agent, or Firm* — Alston & Bird LLP

(57) ABSTRACT

There is disclosed a method, an apparatus, a server, a client and a non-transitory computer readable medium comprising a computer program stored therein for multi view video coding and decoding. View random access (VRA) pictures or access units are coded into a multiview bitstream. VRA pictures enable starting the decoding of a subset of the views present in the bitstream. The views selected to be accessible in VRA pictures are alternated in successive VRA pictures so that all views are gradually reconstructed when two or more VRA pictures have been decoded.

15 Claims, 15 Drawing Sheets

(56) References Cited

U.S. PATENT DOCUMENTS

2013/0114705 A1* 5/2013 Chen ............... H04N 19/00569
375/240.12

OTHER PUBLICATIONS

Extended European Search Report received for corresponding European Patent Application No. 12828190.4, dated Mar. 20, 2015, 10 pages.

Schierl et al., "Transport and Storage Systems for 3-D Video Using MPEG-2 Systems, RTP, and ISO File Format", Proceedings of the IEEE, vol. 99, No. 4, Apr. 2011, pp. 671-683.

"Information Technology—Coding of Audio-Visual Objects—Part 12: ISO Base Media File Format, Amendment 3: Dash Support and RTP Reception Hint Track Processing", ISO/IEC JTC 1/SC 29/WG 11, Aug. 17, 2011, 44 pages.

Merkle et al., "Efficient Prediction Structures for Multiview Video Coding", IEEE Transactions on Circuits and Systems for Video Technology, vol. 17, No. 11, Nov. 2007, pp. 1461-1473.

"Joint Draft 8 of SVC Amendment", Joint Video Team (JVT) of ISO/IEC MPEG & ITU-T VCEG, JVT-U201, ISO/IEC JTC1/SC29/WG11 and ITU-T SG16 Q.6, Oct. 20-27, 2006, 552 pages.

Smolic et al., "3D Video and Free Viewpoint Video—Technologies, Applications and MPEG Standards", IEEE International Conference on Multimedia and Expo, Jul. 9-12, 2006, pp. 2161-2164.

Vetro et al., "Towards a 3D Video Format for Auto-Stereoscopic Displays", SPIE Conference on Applications of Digital Image Processing, vol. 7073, Sep. 2008, 11 pages.

Scharstein et al., "A Taxonomy and Evaluation of Dense Two-Frame Stereo Correspondence Algorithms", International Journal of Computer Vision, vol. 47, Issue 1-3, Apr. 2002, pp. 7-42.

Anderson et al., "Experimental Characterization of Commercial Flash Ladar Devices", International Conference of Sensing and Technology, Nov. 2005, 7 pages.

Kim et al., "Design and Calibration of a Multi-view TOF Sensor Fusion System", IEEE Computer Society Conference on Computer Vision and Pattern Recognition Workshops, Jun. 23-28, 2008, 7 pages.

Tanimoto et al., "Depth Estimation Reference Software (DERS) 4.0", ISO/IEC JTC1/SC29/WG11, MPEG 2009/M16605, Jun. 2009, 3 pages.

Fehn, "Depth-Image-Based Rendering (DIBR), Compression and Transmission for a New Approach on 3D-TV", Proceedings of the SPIE Stereoscopic Displays and Virtual Reality Systems XI, vol. 5291, May 21, 2004, 6 pages.

"3rd Generation Partnership Project; Technical Specification Group Services and System Aspects Transparent End-to-End Packet Switched Streaming Service (PSS); 3GPP File Format (3GP) (Release 8)", 3GPP TS 26.244, V8.2.0, Sep. 2009, pp. 1-52.

Ji et al., "Time-Variable Camera Separation for Compression of Stereoscopic Video", Proceedings of the Visual Communications and Image Processing, vol. 7744, Jul. 14, 2010, 10 pages.

International Search Report and Written Opinion received for corresponding Patent Cooperation Treaty Application No. PCT/FI2012/050843, dated Dec. 17, 2012, 12 pages.

Hannuksela, M. M. et al., "Gradual View Refresh in Depth-Enhanced Multiview Video", IEEE Picture Coding Symposium, Krakow, Poland, May 7-9, 2012, pp. 141-144.

Merkle, P. et al., "Multi-View Video Plus Depth Presentation and Coding", IEEE Int. Conf. on Image Processing, Oct. 2007, pp. 201-204.

Vetro, A. et al., "Overview of the Stereo and Multiview Video Coding Extensions of the H.264/MPEG-4 AVC Standard", Proc. IEEE, vol. 9, No. 4, Apr. 2011, pp. 626-642.

Office Action from corresponding Chinese Patent Application No. 201280052535.2 dated Aug. 18, 2016, 12 pages.

Hannuksela, M. M. et al., "Multiview-Video-Plus-Depth Coding Based on the Advanced Video Coding Standard"; IEEE Transactions on Image Processing; vol. 22, No. 9; p. 3449-3458.

Office Action from corresponding Korean Patent Application No. 10-2014-7008593 dated Sep. 5, 2015.

Office Action for Chinese Patent Application No. 201280052535.2 dated Sep. 11, 2017, with English translation, 9 pages.

Office Action for European Application No. 12828190.4 dated Apr. 20, 2018, 5 pages.

Office Action for India Application No. 1752/CHEMP/2014 dated Dec. 6, 2018, 8 pages.

* cited by examiner

VIDEO CODING AND DECODING

TECHNICAL FIELD

The present invention relates to a method, an apparatus, a server, a client and a non-transitory computer readable medium comprising a computer program stored therein for multi view coding.

BACKGROUND INFORMATION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Advances in digital video coding have enabled the adoption of video into personal communication such as video telephony over mobile communication networks, capture and sharing of personal digital videos and consumption of video content available in internet services. At the same time, perhaps the most significant breakthrough since the addition of color into moving pictures is happening: moving pictures can be viewed in three dimensions, and from different viewing angles. Again, digital video coding is enabling the adoption of this technology into personal, widespread use.

In order to facilitate communication of video content over one or more networks, several coding standards have been developed. Video coding standards include ITU-T H.261, ISO/IEC MPEG-1 Video, ITU-T H.262 or ISO/IEC MPEG-2 Video, ITU-T H.263, ISO/IEC MPEG-4 Visual, ITU-T H.264 (also know as ISO/IEC MPEG-4 AVC), the scalable video coding (SVC) extension of H.264/AVC, and the multiview video coding (MVC) extension of H.264/AVC. In addition, there are currently efforts underway to develop new video coding standards.

The Advanced Video Coding (H.264/AVC) standard is widely used through digital video application domains. A multi-view extension, known as Multi-view Video Coding (MVC), has been standardized as an annex to H.264/AVC. The base view of MVC bitstreams can be decoded by any H.264/AVC decoder, which facilitates introduction of stereoscopic and multi-view content into existing services. MVC allows inter-view prediction, which can result in bitrate savings compared to independent coding of all views, depending on how correlated the adjacent views are. As no new low-level coding tools were introduced in MVC, existing hardware implementations of H.264/AVC are typically applicable as such for MVC.

Many display arrangements for multi-view video are based on rendering of a different image to viewer's left and right eyes. For example, when data glasses or auto-stereoscopic displays are used, only two views are observed at a time in typical MVC applications, such as 3D TV, although the scene can often be viewed from different positions or angles.

In multi-view video coding, video sequences output from different cameras, each corresponding to different views, are encoded into one bit-stream. After decoding, to display a certain view, the decoded pictures belonging to that view are reconstructed and displayed. It is also possible that more than one view is reconstructed and displayed.

Multi-view video coding has a wide variety of applications, including freeviewpoint video/television, 3D TV and surveillance.

As multi-view video coding is becoming more popular and its applications are increasing, there is a need for solutions that further improve the efficiency and quality of multi-view video coding.

SUMMARY

Now there has been invented an improved method and technical equipment implementing the method, by which the above problems are alleviated. View random access (VRA) pictures or access units are coded into a multiview bitstream. VRA pictures enable starting the decoding of a subset of the views present in the bitstream. The views selected to be accessible in VRA pictures are alternated in successive VRA pictures so that all views are gradually reconstructed when two or more VRA pictures have been decoded. If multiview plus depth (MVD) or similar coding arrangement is used, the views that cannot be decoded before a sufficient number of VRA pictures have been received may be synthesized.

Various aspects of the invention include a method, an apparatus, a server, a client and a non-transitory computer readable medium comprising a computer program stored therein.

According to a first aspect of the present invention there is provided a method comprising:

encoding a first picture from a first sequence and a second picture from a second sequence into a first access unit of at least one bitstream;

determining a random access position for the at least one bitstream;

encoding a third picture from the first sequence and a fourth picture from the second sequence into a second access unit of the at least one bitstream, the second access unit following the random access position, the third picture being intra coded and the fourth picture being predicted from the second picture.

In some embodiments a prediction is used to encode a depth picture into the at least one bitstream.

According to a second aspect, there is provided an apparatus comprising at least one processor, memory including computer program code, the memory and the computer program code configured to, with the at least one processor, cause the apparatus to:

encode a first picture from a first sequence and a second picture from a second sequence into a first access unit of at least one bitstream;

determine a random access position for the at least one bitstream; and encode a third picture from the first sequence and a fourth picture from the second sequence into a second access unit of the at least one bitstream, the second access unit following the random access position, the third picture being intra coded and the fourth picture being predicted from the second picture.

According to a third aspect there is provided a computer program embodied on a non-transitory computer readable medium, the computer program comprising instructions causing, when executed on at least one processor, at least one apparatus to encode a first picture from a first sequence and a second picture from a second sequence into a first access unit of at least one bitstream;

determine a random access position for at least one bitstream; and encode a third picture from the first sequence and a fourth picture from the second sequence into a second access unit of the at least one bitstream, the second access unit following the random access position, the third picture being intra coded and the fourth picture being predicted from the second picture.

In some embodiments a prediction is used to encode a depth picture into the at least one bitstream.

According to a fourth aspect there is provided a method comprising:

concluding a first random access position from at least one bitstream, the first random access position being followed by a first access unit comprising a first coded picture from a first view and a second coded picture from a second view, the first coded picture being intra coded and the second coded picture being predicted from a picture preceding the random access position;

starting the decoding from the first random access position;

decoding the first coded picture;

decoding one or more subsequent coded pictures from the first view.

In some example embodiments a second random access position is concluded from the at least one bitstream, the second random access position being followed by a second access unit comprising a third coded picture from the first view and a fourth coded picture from the second view, the fourth coded picture being intra coded;

decoding the third coded picture; and decoding the fourth coded picture.

According to a fifth aspect, there is provided an apparatus comprising at least one processor, memory including computer program code, the memory and the computer program code configured to, with the at least one processor, cause the apparatus to conclude a first random access position from at least one bitstream, the first random access position being followed by a first coded picture from a first view and a second coded picture from a second view, the first coded picture being intra coded and the second coded picture being predicted from a picture prior to the random access position, and the first coded picture and the second coded picture representing a first moment of time;

start the decoding from the first random access position;

decode the first coded picture;

decode one or more subsequent coded pictures from the first view.

According to a sixth aspect there is provided a computer program embodied on a non-transitory computer readable medium, the computer program comprising instructions causing, when executed on at least one processor, at least one apparatus to conclude a first random access position from at least one bitstream, the first random access position being followed by a first coded picture from a first view and a second coded picture from a second view, the first coded picture being intra coded and the second coded picture being predicted from a picture prior to the random access position, and the first coded picture and the second coded picture representing a first moment of time;

start the decoding from the first random access position;

decode the first coded picture;

decode one or more subsequent coded pictures from the first view.

According to a seventh aspect, there is provided an apparatus comprising:

an encoding element configured for encoding a first picture from a first sequence and a second picture from a second sequence into a first access unit of at least one bitstream;

a determinator configured for determining a random access position for the at least one bitstream; and said encoding element further configured for encoding a third picture from the first sequence and a fourth picture from the second sequence into a second access unit of the at least one bitstream, the second access unit following the random access position, the third picture being intra coded and the fourth picture being predicted from the second picture.

According to an eighth aspect, there is provided an apparatus comprising:

a determinator configured for concluding a first random access position from at least one bitstream, the first random access position being followed by a first coded picture from a first view and a second coded picture from a second view, the first coded picture being intra coded and the second coded picture being predicted from a picture prior to the random access position;

an element configured for starting the decoding from the first random access position;

a decoding element configured for decoding the first coded picture and one or more subsequent coded pictures from the first view.

According to a ninth aspect, there is provided an apparatus comprising:

means for encoding a first picture from a first sequence and a second picture from a second sequence into a first access unit of at least one bitstream;

means for determining a random access position for the at least one bitstream; and means for encoding a third picture from the first sequence and a fourth picture from the second sequence into a second access unit of the at least one bitstream, the second access unit following the random access position, the third picture being intra coded and the fourth picture being predicted from the second picture.

According to a tenth aspect, there is provided an apparatus comprising:

means for concluding a first random access position from at least one bitstream, the first random access position being followed by a first coded picture from a first view and a second coded picture from a second view, the first coded picture being intra coded and the second coded picture being predicted from a picture prior to the random access position, and the first coded picture and the second coded picture representing a first moment of time;

means for starting the decoding from the first random access position;

means for decoding the first coded picture;

means for decoding one or more subsequent coded pictures from the first view.

DESCRIPTION OF THE DRAWINGS

In the following, various embodiments of the invention will be described in more detail with reference to the appended drawings, in which.

DETAILED DESCRIPTION OF THE EMBODIMENTS

Figure 1:
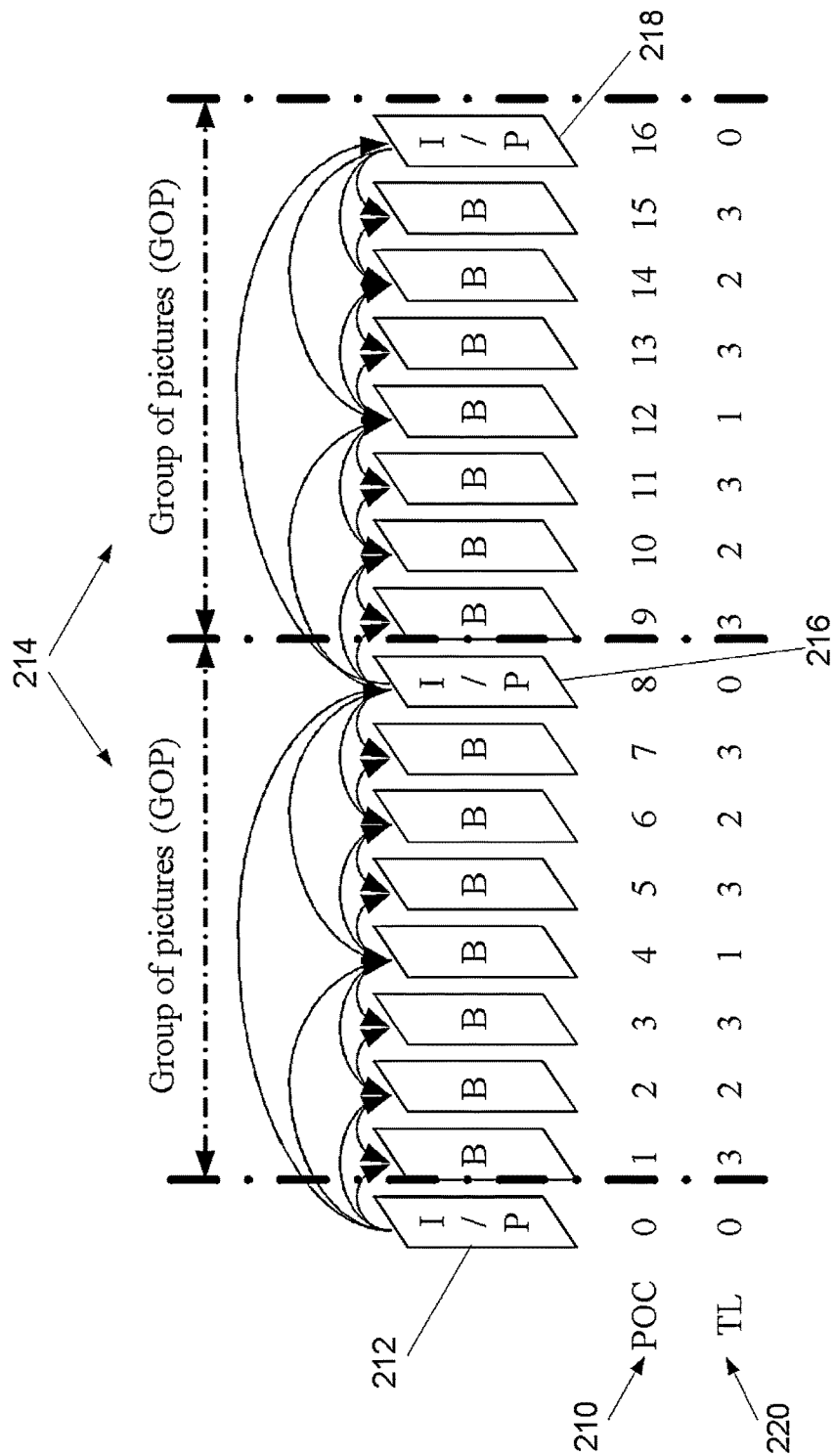
FIG. 1 illustrates an exemplary hierarchical coding structure with temporal scalability.
Figure 2:
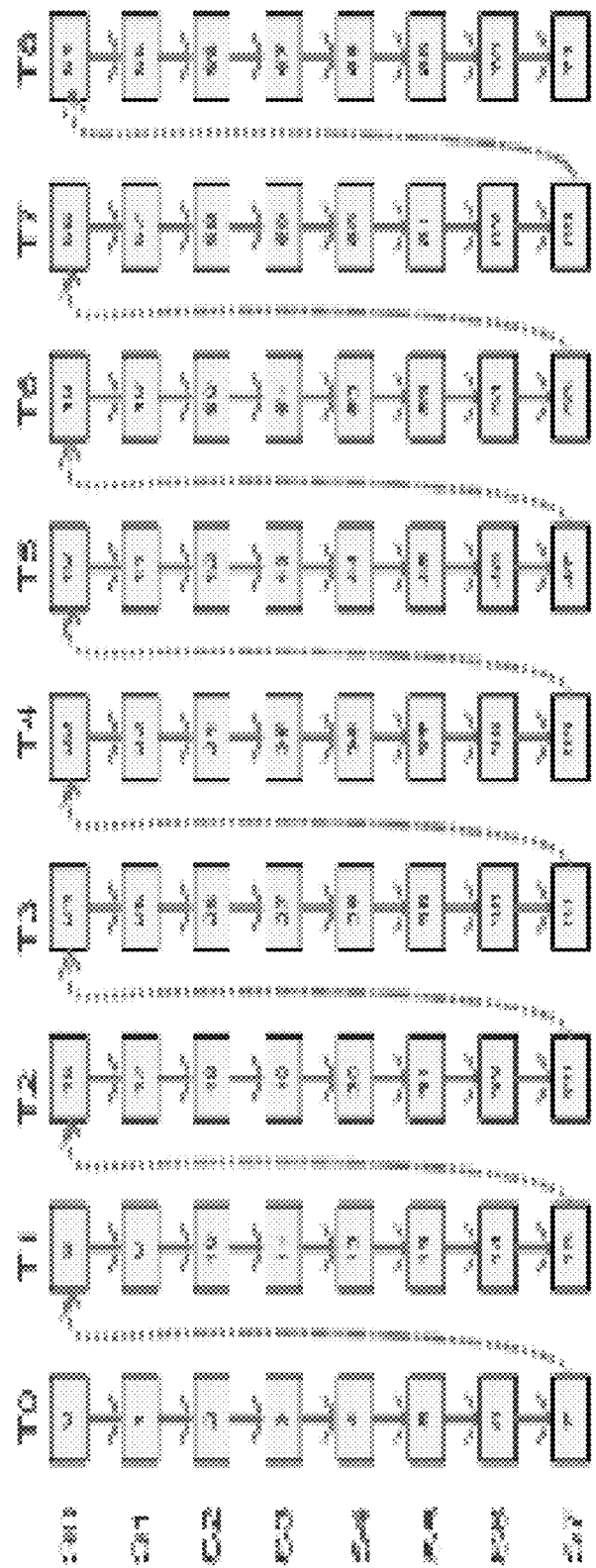
FIG. 2 illustrates an exemplary MVC decoding order.

In the following, several embodiments of the invention will be described in the context of multi-view video coding and/or 3D video. Various embodiments described below relate generally to image and video processing.

Some key definitions, bitstream and coding structures, and concepts of H.264/AVC are described in this section as an example of a video encoder, decoder, encoding method, decoding method, and a bitstream structure, wherein the embodiments may be implemented. The aspects of the invention are not limited to H.264/AVC, but rather the description is given for one possible basis on top of which the invention may be partly or fully realized.

Similarly to many earlier video coding standards, the bitstream syntax and semantics as well as the decoding process for error-free bitstreams are specified in H.264/AVC. The encoding process is not specified, but encoders should generate conforming bitstreams. Bitstream and decoder conformance can be verified with a Hypothetical Reference Decoder (HRD), which is specified in Annex C of H.264/AVC. The standard contains coding tools that help in coping with transmission errors and losses, but the use of the tools in encoding is optional and no decoding process has been specified for erroneous bitstreams.

The elementary unit for the input to an H.264/AVC encoder and the output of an H.264/AVC decoder is a picture. A picture may either be a frame or a field. A frame may comprise a matrix of luma samples and corresponding chroma samples. A field is a set of alternate sample rows of a frame and may be used as encoder input, when the source signal is interlaced. A macroblock is a 16×16 block of luma samples and the corresponding blocks of chroma samples. Chroma pictures may be subsampled when compared to luma pictures. For example, in the 4:2:0 sampling pattern the spatial resolution of chroma pictures is half of that of the luma picture along both coordinate axes and consequently a macroblock contains one 8×8 block of chroma samples per each chroma component. A picture may be partitioned to one or more slice groups, and a slice group contains one or more slices. A slice includes an integer number of macroblocks ordered consecutively in the raster scan order within a particular slice group.

The elementary unit for the output of an H.264/AVC encoder and the input of an H.264/AVC decoder is a Network Abstraction Layer (NAL) unit. Decoding of partial or corrupted NAL units is typically remarkably difficult. For transport over packet-oriented networks or storage into structured files, NAL units may be encapsulated into packets or similar structures. A bytestream format has been specified in H.264/AVC for transmission or storage environments that do not provide framing structures. The bytestream format separates NAL units from each other by attaching a start code in front of each NAL unit. To avoid false detection of NAL unit boundaries, encoders may run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention is performed always regardless of whether the bytestream format is in use or not.

H.264/AVC, as many other video coding standards, allows splitting of a coded picture into slices. In-picture prediction is disabled across slice boundaries. Thus, slices can be regarded as a way to split a coded picture into independently decodable pieces, and slices are therefore elementary units for transmission.

Some profiles of H.264/AVC enable the use of up to eight slice groups per coded picture. When more than one slice group is in use, the picture is partitioned into slice group map units, which are equal to two vertically consecutive macroblocks when the macroblock-adaptive frame-field (MBAFF) coding is in use and equal to a macroblock otherwise. The picture parameter set contains data based on which each slice group map unit of a picture is associated with a particular slice group. A slice group can contain any slice group map units, including non-adjacent map units. When more than one slice group is specified for a picture, the flexible macroblock ordering (FMO) feature of the standard is used.

In H.264/AVC, a slice consists of one or more consecutive macroblocks (or macroblock pairs, when MBAFF is in use) within a particular slice group in raster scan order. If only one slice group is in use, H.264/AVC slices contain consecutive macroblocks in raster scan order and are therefore similar to the slices in many previous coding standards. In some profiles of H.264/AVC slices of a coded picture may appear in any order relative to each other in the bitstream, which is referred to as the arbitrary slice ordering (ASO) feature. Otherwise, slices must be in raster scan order in the bitstream.

NAL units consist of a header and payload. The NAL unit header indicates the type of the NAL unit and whether a coded slice contained in the NAL unit is a part of a reference picture or a non-reference picture. The header for SVC and MVC NAL units additionally contains various indications related to the scalability and multiview hierarchy.

The bitstream syntax of H.264/AVC indicates whether a particular picture is a reference picture for inter prediction of any other picture. Consequently, a picture not used for prediction, a non-reference picture, can be safely disposed. Pictures of any coding type (I, P, B) can be reference pictures or non-reference pictures in H.264/AVC. The NAL unit header indicates the type of the NAL unit and whether a coded slice contained in the NAL unit is a part of a reference picture or a non-reference picture.

Many hybrid video codecs, including H.264/AVC, encode video information in two phases. In the first phase, pixel or sample values in a certain picture area or "block" are predicted. These pixel or sample values can be predicted, for example, by motion compensation mechanisms, which involve finding and indicating an area in one of the previously encoded video frames that corresponds closely to the block being coded. Additionally, pixel or sample values can be predicted by spatial mechanisms which involve finding and indicating a spatial region relationship.

Prediction approaches using image information from a previously coded image can also be called as inter prediction methods which may be also referred to as temporal prediction and motion compensation. Prediction approaches using image information within the same image can also be called as intra prediction methods.

In many video coding systems, including H.264/AVC, the error between the predicted block of pixels or samples and the original block of pixels or samples is encoded. This may be accomplished by transforming the difference in pixel or sample values using a specified transform. This transform may be a Discrete Cosine Transform (DCT) or a variant thereof. After transforming the difference, the transformed difference is quantized and entropy encoded.

By varying the fidelity of the quantization process, the encoder can control the balance between the accuracy of the pixel or sample representation (i.e. the visual quality of the picture) and the size of the resulting encoded video representation (i.e. the file size or transmission bit rate). In H.264/AVC, the quantization parameter (QP) is used to control the quantization step size and hence the fidelity of the quantization process.

The decoder reconstructs the output video by applying a prediction mechanism similar to that used by the encoder in order to form a predicted representation of the pixel or sample blocks (using the motion or spatial information created by the encoder and stored in the compressed representation of the image) and prediction error decoding (the inverse operation of the prediction error coding to recover the quantized prediction error signal in the spatial domain).

After applying pixel or sample prediction and error decoding processes the decoder combines the prediction and the prediction error signals (the pixel or sample values) to form the output video frame.

The decoder (and encoder) may also apply additional filtering processes in order to improve the quality of the output video before passing it for display and/or storing as a prediction reference for the forthcoming pictures in the video sequence.

In many video codecs, including H.264/AVC, motion information is indicated by motion vectors associated with each motion compensated image block. Each of these motion vectors represents the displacement of the image block in the picture to be coded (in the encoder) or decoded (at the decoder) and the prediction source block in one of the previously coded or decoded images (or pictures). H.264/AVC, as many other video compression standards, divides a picture into a mesh of rectangles, for each of which a similar block in one of the reference pictures is indicated for inter prediction. The location of the prediction block is coded as motion vector that indicates the position of the prediction block compared to the block being coded.

H.264/AVC enables the use of a single prediction block in P and SP slices (herein referred to as uni-predictive slices) or a linear combination of two motion-compensated prediction blocks for bi-predictive slices, which are also referred to as B slices. Individual blocks in B slices may be bi-predicted, uni-predicted, or intra-predicted, and individual blocks in P or SP slices may be uni-predicted or intra-predicted. In H.264/AVC the reference pictures for a bi-predictive picture are not limited to be the subsequent picture and the previous picture in output order, but rather any reference pictures can be used.

H.264/AVC specifies the process for decoded reference picture marking in order to control the memory consumption in the decoder. The maximum number of reference pictures used for inter prediction, referred to as M, is determined in the sequence parameter set. When a reference picture is decoded, it is marked as "used for reference". If the decoding of the reference picture caused more than M pictures marked as "used for reference", at least one picture is marked as "unused for reference". There are two types of operations for decoded reference picture marking: adaptive memory control and sliding window. The operation mode for decoded reference picture marking is selected on picture basis. The adaptive memory control enables explicit signaling which pictures are marked as "unused for reference" and may also assign long-term indices to short-term reference pictures. The adaptive memory control may require the presence of memory management control operation (MMCO) parameters in the bitstream. If the sliding window operation mode is in use and there are M pictures marked as "used for reference", the short-term reference picture that was the first decoded picture among those short-term reference pictures that are marked as "used for reference" is marked as "unused for reference". In other words, the sliding window operation mode results into first-in-first-out buffering operation among short-term reference pictures.

One of the memory management control operations in H.264/AVC causes all reference pictures except for the current picture to be marked as "unused for reference". An instantaneous decoding refresh (IDR) picture contains only intra-coded slices and causes a similar "reset" of reference pictures.

The reference picture for inter prediction is indicated with an index to a reference picture list. The index may be coded with variable length coding, e.g., the smaller the index is, the shorter the corresponding syntax element becomes. Two reference picture lists (reference picture list 0 and reference picture list 1) are generated for each bi-predictive slice of H.264/AVC, and one reference picture list (reference picture list 0) is formed for each inter-coded (P or SP) slice of H.264/AVC. A reference picture list is constructed in two steps: first, an initial reference picture list is generated, and then the initial reference picture list may be reordered by reference picture list reordering (RPLR) commands contained in slice headers. The RPLR commands indicate the pictures that are ordered to the beginning of the respective reference picture list.

A frame_num syntax element is used for various decoding processes related to multiple reference pictures. In H.264/AVC, the value of frame_num for IDR pictures is 0. The value of frame_num for non-IDR pictures is equal to the frame_num of the previous reference picture in decoding order incremented by 1 (in modulo arithmetic, i.e., the value of frame_num wrap over to 0 after a maximum value of frame_num).

A value of picture order count (POC) may be derived for each picture and it may be non-decreasing with increasing picture position in output order relative to the previous IDR picture or a picture containing a memory management control operation marking all pictures as "unused for reference". The picture order count therefore indicates the output order of pictures. It is also used in the decoding process for implicit scaling of motion vectors in the temporal direct mode of bi-predictive slices, for implicitly derived weights in weighted prediction, and for reference picture list initialization of B slices. Furthermore, the picture order count may be used in the verification of output order conformance.

A hypothetical reference decoder (HRD) may be used to check bitstream and decoder conformance. The HRD may contain a coded picture buffer (CPB), an instantaneous decoding process, a decoded picture buffer (DPB), and an output picture cropping block. The CPB and the instantaneous decoding process are specified similarly to any other video coding standard, and the output picture cropping block simply crops those samples from the decoded picture that are outside the signaled output picture extents.

The operation of the coded picture buffering in the HRD can be simplified as follows. It is assumed that bits arrive into the CPB at a constant arrival bitrate. Hence, coded pictures or access units are associated with initial arrival time, which indicates when the first bit of the coded picture or access unit enters the CPB. Furthermore, the coded pictures or access units are assumed to be removed instantaneously when the last bit of the coded picture or access unit is inserted into CPB and the respective decoded picture is inserted then to the DPB, thus simulating instantaneous decoding. This time is referred to as the removal time of the coded picture or access unit. The removal time of the first coded picture of the coded video sequence is typically controlled, for example by a Buffering Period Supplemental Enhancement Information (SEI) message. This so-called initial coded picture removal delay ensures that any variations of the coded bitrate, with respect to the constant bitrate used to fill in the CPB, do not cause starvation or overflow of the CPB. It is to be understood that the operation of the HRD is somewhat more sophisticated than what described here, having for example the low-delay operation mode and the capability to operate at many different constant bitrates.

The DPB is used to control the required memory resources for decoding of conformant bitstreams. There are two reasons to buffer decoded pictures, for references in inter prediction and for reordering decoded pictures into output order. As H.264/AVC provides a great deal of flexibility for both reference picture marking and output reordering, separate buffers for reference picture buffering and output picture buffering could have been a waste of memory resources. Hence, the DPB includes a unified decoded picture buffering process for reference pictures and output reordering. A decoded picture is removed from the DPB when it is no longer used as reference and needed for output. The maximum size of the DPB that bitstreams are allowed to use is specified in the Level definitions (Annex A) of H.264/AVC.

There are two types of conformance for decoders: output timing conformance and output order conformance. For output timing conformance, a decoder outputs pictures at identical times compared to the HRD. For output order conformance, only the correct order of output picture is taken into account. The output order DPB is assumed to contain a maximum allowed number of frame buffers. A frame is removed from the DPB when it is no longer used as a reference and needed for output. When the DPB becomes full, the earliest frame in output order is output until at least one frame buffer becomes unoccupied.

Picture timing and the operation of the HRD may be controlled by two Supplemental Enhancement Information (SEI) messages: Buffering Period and Picture Timing SEI messages. The Buffering Period SEI message specifies the initial CPB removal delay. The Picture Timing SEI message specifies other delays (cpb_removal_delay and dpb_removal_delay) related to the operation of the HRD as well as the output times of the decoded pictures. The information of Buffering Period and Picture Timing SEI messages may also be conveyed through other means and need not be included into H.264/AVC bitstreams.

NAL units can be categorized into Video Coding Layer (VCL) NAL units and non-VCL NAL units. VCL NAL units are either coded slice NAL units, coded slice data partition NAL units, or VCL prefix NAL units. Coded slice NAL units contain syntax elements representing one or more coded macroblocks, each of which corresponds to a block of samples in the uncompressed picture. There are four types of coded slice NAL units: coded slice in an Instantaneous Decoding Refresh (IDR) picture, coded slice in a non-IDR picture, coded slice of an auxiliary coded picture (such as an alpha plane) and coded slice extension (for coded slices in scalable or multiview extensions). A set of three coded slice data partition NAL units contains the same syntax elements as a coded slice. Coded slice data partition A comprises macroblock headers and motion vectors of a slice, while coded slice data partition B and C include the coded residual data for intra macroblocks and inter macroblocks, respectively. A VCL prefix NAL unit precedes a coded slice of the base layer in SVC bitstreams and contains indications of the scalability hierarchy of the associated coded slice.

A non-VCL NAL unit may be of one of the following types: a sequence parameter set, a picture parameter set, a supplemental enhancement information (SEI) NAL unit, an access unit delimiter, an end of sequence NAL unit, an end of stream NAL unit, or a filler data NAL unit. Parameter sets may be needed for the reconstruction of decoded pictures, whereas the other non-VCL NAL units are not necessary for the reconstruction of decoded sample values and serve other purposes.

In order to transmit infrequently changing coding parameters robustly, the parameter set mechanism was adopted to H.264/AVC. Parameters that remain unchanged through a coded video sequence are included in a sequence parameter set. In addition to the parameters that are essential to the decoding process, the sequence parameter set may optionally contain video usability information (VUI), which includes parameters that may be important for buffering, picture output timing, rendering, and resource reservation. A picture parameter set contains such parameters that are likely to be unchanged in several coded pictures. No picture header is present in H.264/AVC bitstreams but the frequently changing picture-level data is repeated in each slice header and picture parameter sets carry the remaining picture-level parameters. H.264/AVC syntax allows many instances of sequence and picture parameter sets, and each instance is identified with a unique identifier. Each slice header includes the identifier of the picture parameter set that is active for the decoding of the picture that contains the slice, and each picture parameter set contains the identifier of the active sequence parameter set. Consequently, the transmission of picture and sequence parameter sets does not have to be accurately synchronized with the transmission of slices. Instead, it is sufficient that the active sequence and picture parameter sets are received at any moment before they are referenced, which allows transmission of parameter sets using a more reliable transmission mechanism compared to the protocols used for the slice data. For example, parameter sets can be included as a parameter in the session description for H.264/AVC RTP sessions. An out-of-band reliable transmission mechanism may be used whenever it is possible in the application in use. If parameter sets are transmitted in-band, they can be repeated to improve error robustness.

A SEI NAL unit contains one or more SEI messages, which are not required for the decoding of output pictures but assist in related processes, such as picture output timing, rendering, error detection, error concealment, and resource reservation. Several SEI messages are specified in H.264/AVC, and the user data SEI messages enable organizations and companies to specify SEI messages for their own use. H.264/AVC contains the syntax and semantics for the specified SEI messages but no process for handling the messages in the recipient is defined. Consequently, encoders may follow the H.264/AVC standard when they create SEI messages, and decoders conforming to the H.264/AVC standard are not required to process SEI messages for output order conformance. One of the reasons to include the syntax and semantics of SEI messages in H.264/AVC is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

A coded picture includes in H.264/AVC the VCL NAL units that may be required for the decoding of the picture. A coded picture can be a primary coded picture or a redundant coded picture. A primary coded picture is used in the decoding process of valid bitstreams, whereas a redundant coded picture is a redundant representation that should only be decoded when the primary coded picture cannot be successfully decoded.

In H.264/AVC, an access unit includes a primary coded picture and those NAL units that are associated with it. The NAL units of an access unit are consecutive in decoding order. In addition to the primary coded picture, an access unit may also contain one or more redundant coded pictures, one auxiliary coded picture, or other NAL units not containing slices or slice data partitions of a coded picture. The decoding of an access unit may result in a decoded picture. The appearance order of NAL units within an access unit may be constrained as follows. An optional access unit delimiter NAL unit may indicate the start of an access unit. It is followed by zero or more SEI NAL units. The coded slices or slice data partitions of the primary coded picture appear next, followed by coded slices for zero or more redundant coded pictures.

A coded video sequence is defined to be a sequence of consecutive access units in decoding order from an IDR access unit, inclusive, to the next IDR access unit, exclusive, or to the end of the bitstream, whichever appears earlier.

Scalable Coding and SVC

H.264/AVC enables hierarchical temporal scalability. Its extensions SVC and MVC provide some additional indications, particularly the temporal_id syntax element in the NAL unit header, which makes the use of temporal scalability more straightforward. Temporal scalability provides refinement of the video quality in the temporal domain, by giving flexibility of adjusting the frame rate. A review of different types of scalability offered by SVC is provided in the subsequent paragraphs and a more detailed review of temporal scalability is provided further below.

In scalable video coding, a video signal can be encoded into a base layer and one or more enhancement layers. An enhancement layer enhances the temporal resolution (i.e., the frame rate), the spatial resolution, or simply the quality of the video content represented by another layer or part thereof. Each layer together with all its dependent layers is one representation of the video signal at a certain spatial resolution, temporal resolution and quality level. In this application, a scalable layer together with all of its dependent layers, is referred to as a "scalable layer representation". The portion of a scalable bitstream corresponding to a scalable layer representation can be extracted and decoded to produce a representation of the original signal at certain fidelity.

In some cases, data in an enhancement layer can be truncated after a certain location, or even at arbitrary positions, where each truncation position may include additional data representing increasingly enhanced visual quality. Such scalability is referred to as fine-grained (granularity) scalability (FGS). In contrast to FGS, the scalability provided by those enhancement layers that cannot be truncated is referred to as coarse-grained (granularity) scalability (CGS). It collectively includes the traditional quality (SNR) scalability and spatial scalability. The SVC draft standard also supports the so-called medium-grained scalability (MGS), where quality enhancement pictures are coded similarly to SNR scalable layer pictures but indicated by high-level syntax elements similarly to FGS layer pictures, by having the quality_id syntax element greater than 0.

SVC uses an inter-layer prediction mechanism, wherein certain information can be predicted from layers other than the currently reconstructed layer or the next lower layer. Information that could be inter-layer predicted includes intra texture, motion and residual data. Inter-layer motion prediction includes the prediction of block coding mode, header information, etc., wherein motion from the lower layer may be used for prediction of the higher layer. In case of intra coding, a prediction from surrounding macroblocks or from co-located macroblocks of lower layers is possible. These prediction techniques do not employ information from earlier coded access units and, hence, are referred to as intra prediction techniques. Furthermore, residual data from lower layers can also be employed for prediction of the current layer.

The scalability structure in SVC is characterized by three syntax elements: "temporal_id," "dependency_id" and "quality_id." The syntax element "temporal_id" is used to indicate the temporal scalability hierarchy or, indirectly, the frame rate. A scalable layer representation comprising pictures of a smaller maximum "temporal_id" value has a smaller frame rate than a scalable layer representation comprising pictures of a greater maximum "temporal_id". A given temporal layer may depend on the lower temporal layers (i.e., the temporal layers with smaller "temporal_id" values) but does not depend on any higher temporal layer. The syntax element "dependency_id" is used to indicate the CGS inter-layer coding dependency hierarchy (which, as mentioned earlier, includes both SNR and spatial scalability). At any temporal level location, a picture of a smaller "dependency_id" value may be used for inter-layer prediction for coding of a picture with a greater "dependency_id" value. The syntax element "quality_id" is used to indicate the quality level hierarchy of a FGS or MGS layer. At any temporal location, and with an identical "dependency_id" value, a picture with "quality_id" equal to QL uses the picture with "quality_id" equal to QL−1 for inter-layer prediction. A coded slice with "quality_id" larger than 0 may be coded as either a truncatable FGS slice or a non-truncatable MGS slice.

For simplicity, all data units (e.g., Network Abstraction Layer units or NAL units in the SVC context) in one access unit having identical value of "dependency_id" are referred to as a dependency unit or a dependency representation. Within one dependency unit, all data units having identical value of "quality_id" are referred to as a quality unit or layer representation.

A base representation, also known as a decoded base picture or a reference base picture, is a decoded picture resulting from decoding the Video Coding Layer (VCL) NAL units of a dependency unit having "quality_id" equal to 0 and for which the "store_ref_base_pic_flag" is set equal to 1. An enhancement representation, also referred to as a decoded picture, results from the regular decoding process in which all the layer representations that are present for the highest dependency representation are decoded.

Each H.264/AVC VCL NAL unit (with NAL unit type in the scope of 1 to 5) is preceded by a prefix NAL unit in an SVC bitstream. A compliant H.264/AVC decoder implementation ignores prefix NAL units. The prefix NAL unit includes the "temporal_id" value and hence an SVC decoder, that decodes the base layer, can learn from the prefix NAL units the temporal scalability hierarchy. Moreover, the prefix NAL unit includes reference picture marking commands for base representations.

SVC uses the same mechanism as H.264/AVC to provide temporal scalability. Temporal scalability provides refinement of the video quality in the temporal domain, by giving flexibility of adjusting the frame rate. A review of temporal scalability is provided in the subsequent paragraphs.

The earliest scalability introduced to video coding standards was temporal scalability with B pictures in MPEG-1 Visual. In this B picture concept, a B picture is bi-predicted from two pictures, one preceding the B picture and the other succeeding the B picture, both in display order. In bi-prediction, two prediction blocks from two reference pictures are averaged sample-wise to get the final prediction block. Conventionally, a B picture is a non-reference picture (i.e., it is not used for inter prediction reference by other pictures). Consequently, the B pictures could be discarded to achieve a temporal scalability point with a lower frame rate. The same mechanism was retained in MPEG-2 Video, H.263 and MPEG-4 Visual.

In H.264/AVC, the concept of B pictures or B slices has been changed compared to that of MPEG-1 Visual. The definition of B slice is as follows: A slice that may be decoded using intra prediction from decoded samples within the same slice or inter prediction from previously-decoded reference pictures, using at most two motion vectors and reference indices to predict the sample values of each block. A block in a B slice may be predicted from two reference pictures in the same or different direction in display order, and a picture including B slices may be referred by other pictures for inter prediction.

In H.264/AVC, SVC, and MVC, temporal scalability can be achieved by using non-reference pictures and/or hierarchical inter prediction structure. Using only non-reference pictures enables to achieve similar temporal scalability as using conventional B pictures in MPEG-1/2/4, by discarding non-reference pictures. Hierarchical coding structure can achieve more flexible temporal scalability.

Referring now to the FIG. 1, an exemplary hierarchical coding structure is illustrated with four levels of temporal scalability. The display order is indicated by the values denoted as picture order count (POC) 210. The I or P pictures at temporal level (TL) 0, such as I/P picture 212, also referred to as key pictures, are coded as the first picture of a group of pictures (GOPs) 214 in decoding order. When a key picture (e.g., key picture 216, 218) is inter-coded, the previous key pictures 212, 216 are used as reference for inter prediction. These pictures correspond to the lowest temporal level 220 (denoted as TL in the figure) in the temporal scalable structure and are associated with the lowest frame rate. Pictures of a higher temporal level may only use pictures of the same or lower temporal level for inter prediction. With such a hierarchical coding structure, different temporal scalability corresponding to different frame rates can be achieved by discarding pictures of a certain temporal level value and beyond. In the FIG. 1, the pictures 0, 8 and 16 are of the lowest temporal level, while the pictures 1, 3, 5, 7, 9, 11, 13 and 15 are of the highest temporal level. Other pictures are assigned with other temporal level hierarchically. These pictures of different temporal levels compose the bitstream of different frame rate. When decoding all the temporal levels, a frame rate of 30 Hz is obtained (assuming that the original sequence that was encoded had 30 Hz frame rate). Other frame rates can be obtained by discarding pictures of some temporal levels. The pictures of the lowest temporal level are associated with the frame rate of 3.75 Hz. A temporal scalable layer with a lower temporal level or a lower frame rate is also called as a lower temporal layer.

The above-described hierarchical B picture coding structure is the most typical coding structure for temporal scalability. However, it is noted that much more flexible coding structures are possible. For example, the GOP size may not be constant over time. In another example, the temporal enhancement layer pictures do not have to be coded as B slices; they may also be coded as P slices.

In H.264/AVC, the temporal level may be signaled by the sub-sequence layer number in the sub-sequence information Supplemental Enhancement Information (SEI) messages. In SVC and MVC, the temporal level may be signaled in the Network Abstraction Layer (NAL) unit header by the syntax element "temporal_id". The bitrate and frame rate information for each temporal level may be signaled in the scalability information SEI message.

Multiview Video Coding (MVC)

In multi-view video coding, video sequences from different views, each corresponding for example to different cameras, are encoded into one bit-stream. After decoding, to display a certain view, the decoded pictures belonging to that view are reconstructed and displayed. It is also possible that more than one view is reconstructed and displayed.

Multi-view video coding has a wide variety of applications, including freeviewpoint video/television, 3D TV and surveillance.

An access unit in MVC is defined to be a set of NAL units that are consecutive in decoding order and contain exactly one primary coded picture consisting of one or more view components. In addition to the primary coded picture, an access unit may also contain one or more redundant coded pictures, one auxiliary coded picture, or other NAL units not containing slices or slice data partitions of a coded picture. The decoding of an access unit may result in one decoded picture consisting of one or more decoded view components. In other words, an access unit in MVC may contain the view components of the views for one output time instance.

A view component in MVC is referred to as a coded representation of a view in a single access unit. An anchor picture is a coded picture in which all slices may reference only slices within the same access unit, i.e., inter-view prediction may be used, but no inter prediction is used, and all following coded pictures in output order do not use inter prediction from any picture prior to the coded picture in decoding order. Inter-view prediction may be used for IDR view components that are part of a non-base view. A base view in MVC is a view that has the minimum value of view order index in a coded video sequence. The base view can be decoded independently of other views and does not use inter-view prediction. The base view can be decoded by H.264/AVC decoders supporting only the single-view profiles, such as the Baseline Profile or the High Profile of H.264/AVC.

Figure 3:
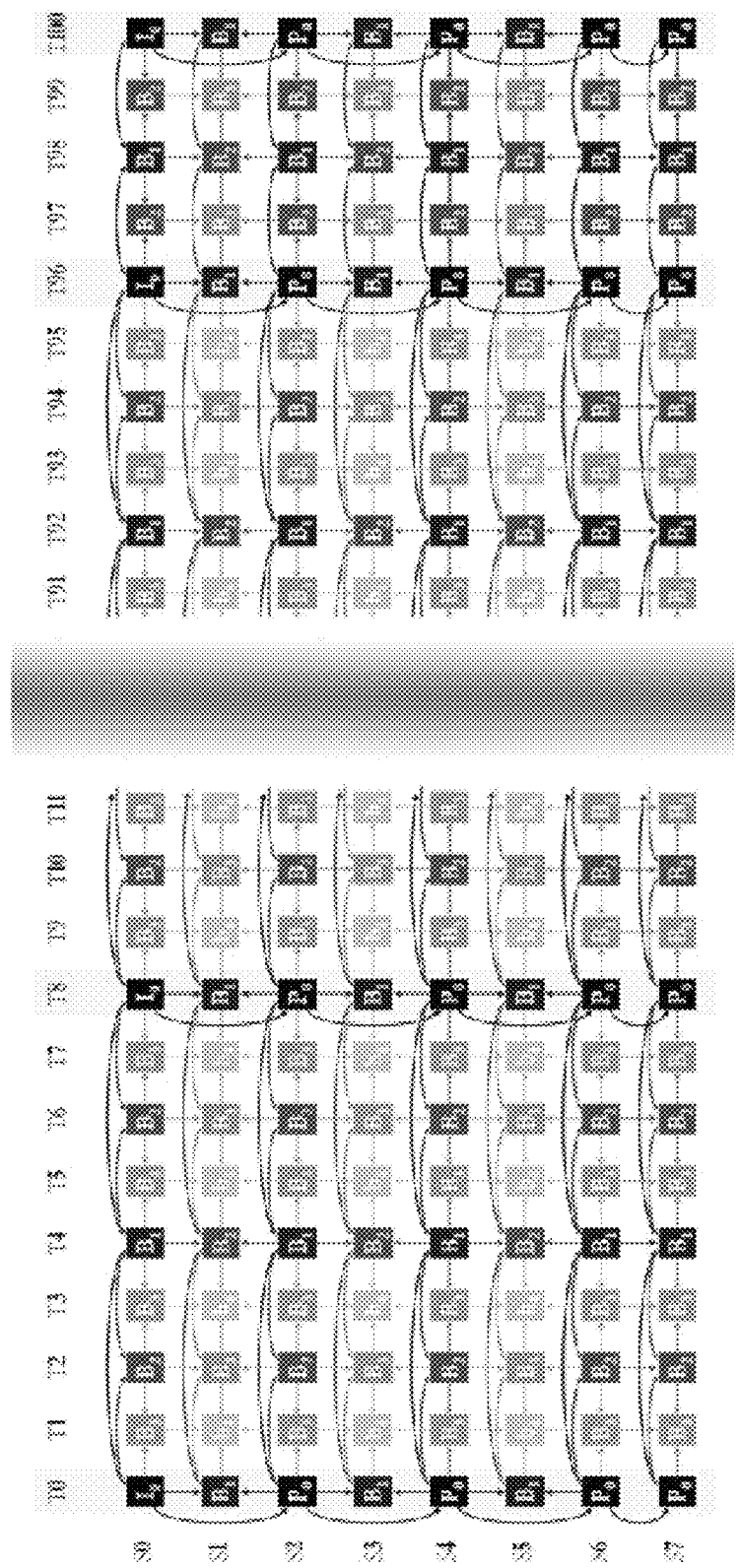
FIG. 3 illustrates an exemplary MVC prediction structure for multi-view video coding.

Referring now to the FIG. 3, an exemplary MVC prediction (including both inter prediction within each view and inter-view prediction) structure for multi-view video coding is illustrated. In the illustrated structure, predictions are indicated by arrows, the pointed-to object using the point-from object for prediction reference.

An anchor picture is a coded picture in which all slices reference only slices with the same temporal index, i.e., only slices in other views and not slices in earlier pictures of the current view. An anchor picture may be signaled by setting the "anchor_pic_flag" to 1. After decoding the anchor picture, all following coded pictures in display order can be decoded without inter-prediction from any picture decoded prior to the anchor picture. If anchor_pic_flag is equal to 1 for a view component, then all view components in the same access unit also have anchor_pic_flag equal to 1. Consequently, decoding of any view can be started from a temporal index that corresponds to anchor pictures. Pictures with "anchor_pic_flag" equal to 0 are named non-anchor pictures.

In MVC, view dependencies are specified in the sequence parameter set (SPS) MVC extension. The dependencies for anchor pictures and non-anchor pictures are independently specified. Therefore anchor pictures and non-anchor pictures can have different view dependencies. However, for the set of pictures that refer to the same SPS, all the anchor pictures have the same view dependency, and all the non-anchor pictures have the same view dependency. Furthermore, in the SPS MVC extension, dependent views are signaled separately for the views used as reference pictures in reference picture list 0 and for the views used as reference pictures in reference picture list 1.

In MVC, there is an "inter_view_flag" in the network abstraction layer (NAL) unit header which indicates whether the current picture is not used or is allowed to be used for inter-view prediction for the pictures in other views. Non-reference pictures (with "nal_ref_idc" equal to 0) which are used as for inter-view prediction reference (i.e. having "inter_view_flag" equal to 1) are called inter-view only reference pictures. Pictures with "nal_ref_idc" greater than 0 and which are used for inter-view prediction reference (i.e. having "inter_view_flag equal to 1") are called inter-view reference pictures.

In MVC, inter-view prediction is supported by texture prediction (i.e., the reconstructed sample values may be used for inter-view prediction), and only the decoded view components of the same output time instance (i.e., the same access unit) as the current view component are used for inter-view prediction. The fact that reconstructed sample values are used in inter-view prediction also implies that MVC utilizes multi-loop decoding. In other words, motion compensation and decoded view component reconstruction are performed for each view.

In the MVC standard, many of the sub-processes of the MVC decoding process use the respective sub-processes of the H.264/AVC standard by replacing term "picture", "frame", and "field" in the sub-process specification of the H.264/AVC standard by "view component", "frame view component", and "field view component", respectively. Likewise, terms "picture", "frame", and "field" are often used in the following to mean "view component", "frame view component", and "field view component", respectively.

The process of constructing reference picture lists in MVC is summarized as follows. First, an initial reference picture list is generated in two steps: i) An initial reference picture list is constructed including all the short-term and long-term reference pictures that are marked as "used for reference" and belong to the same view as the current slice as done in H.264/AVC. Those short-term and long-term reference pictures are named intra-view references for simplicity. ii) Then, inter-view reference pictures and inter-view only reference pictures are appended after the intra-view references, according to the view dependency order indicated in the active SPS and the "inter_view_flag" to form an initial reference picture list.

After the generation of an initial reference picture list in MVC, the initial reference picture list may be reordered by reference picture list reordering (RPLR) commands which may be included in a slice header. The RPLR process may reorder the intra-view reference pictures, inter-view reference pictures and inter-view only reference pictures into a different order than the order in the initial list. Both the initial list and final list after reordering must contain only a certain number of entries indicated by a syntax element in the slice header or the picture parameter set referred by the slice.

Reference picture marking in MVC is performed identically to H.264/AVC for each view independently as if other views were not present in the bitstream.

The DPB operation in MVC is similar to that of H.264/AVC except for the following. Non-reference pictures (with "nal_ref_idc" equal to 0) that are used as for inter-view prediction reference are called inter-view only reference pictures, and the term "interview reference pictures" only refer to those pictures with "nal_ref_idc" greater than 0 and are used for inter-view prediction reference. In some draft versions of MVC, inter-view only reference pictures are marked as "used for reference", stored in the DPB, implicitly marked as "unused for reference" after decoding the access unit, and implicitly removed from the DPB when they are no longer needed for output and inter-view reference.

In MVC coded slices, after the first byte of NAL (Network Abstraction Layer) unit, a NAL unit header extension (3 bytes) is followed. The NAL unit header extension includes the syntax elements that describe the properties of the NAL unit in the context of MVC.

MVC scalable nesting SEI message may be used to contain other SEI messages, which were typically specified for single-view (H.264/AVC) use. The MVC Scalable Nesting SEI message indicates the view_id values for which the contained SEI messages apply to.

While MVC enables encoding of multiview video into a single bitstream, other approaches of encoding multiview video may also be applied. For example, each view may be coded with an encoder for single-view video encoder, such as an H.264/AVC encoder using the High Profile, into separate bitstreams. The association of the bitstreams into views and into a multiview representation may be done for example using appropriate metadata in a container file format including or referring to the bitstreams.

Depth-enhanced Video

Stereoscopic and multiview displays differ in characteristics and typical viewing distances. Consequently, the depth or disparity range in a coded bitstream may not match a comfortable depth range on a viewing device. A multiview video format should therefore enable rendering-time adjustment of the disparity between rendered views. In practice, one or more views may have to be synthesized from the coded views for these purposes. A review of depth-enhanced video is provided below.

A texture view refers to a view that represents ordinary video content, for example has been captured using an ordinary camera, and is usually suitable for rendering on a display.

In the following it is assumed that we would like to view a stereoscopic video content on a stereo display.

Stereoscopic video content consists of pairs of offset images that are shown separately to the left and right eye of the viewer. These offset images may be captured with a specific stereoscopic camera setup and it may assume a particular stereo baseline distance between cameras.

Figure 12:
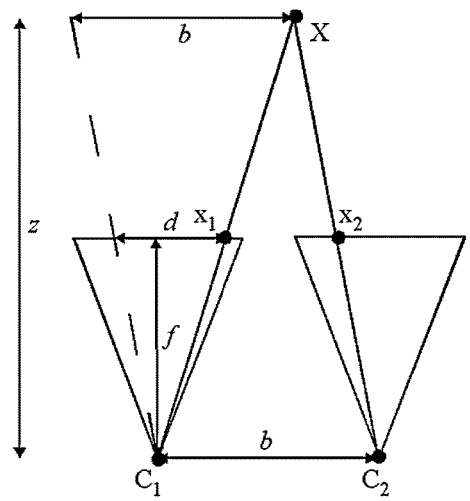
FIG. 12 shows a simplified 2D model of a stereoscopic camera setup.

FIG. 12 shows a simplified 2D model of such stereoscopic camera setup. Terms C1, C2 are stated for center locations of the cameras, b is a distance between centers of two cameras (stereo baseline), f is focal length of the cameras and X is an object in the real 3D scene that being captured. A real world object X is projected to different locations in images captured by cameras C1 and C2, these locations are x1 and x2 respectively. The horizontal distance between x1 and x2 in absolute coordinates of the image is called disparity.

Images that are captured with such camera setup are called stereoscopic images. Disparity that is presented in these images would lead to creating or enhancing of the illusion of depth.

However, stereoscopic displays may significantly differ from each other in such characteristics as viewing distances and disparity shifts. Consequently, the depth or disparity range in a displayed stereo video may not match a comfortable depth range on a viewing device. A mismatch of these parameters may lead to reduced stereo experience and even to viewer's eye fatigue or nausea. In order to avoid these undesirable effects, stereo display should be able to adapt disparity in stereoscopic content automatically, or by providing this functionality to a viewer on demand.

Figure 13:
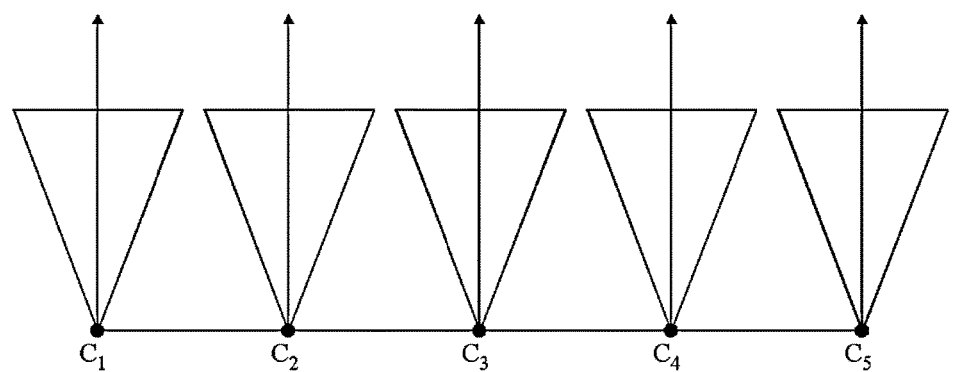
FIG. 13 shows a simplified model of such multiview camera setup.

However, disparity adaptation is not a straightforward process. It may require either having additional camera views with different baseline distance (b is variable) or rendering of virtual camera views which were not available in real world. FIG. 13 shows a simplified model of such multiview camera setup that suits to this solution. This setup is able to provide stereoscopic video content captured with several discrete values for stereoscopic baseline and thus allow stereoscopic display to select a pair of cameras that suits to the viewing conditions.

Figure 14:
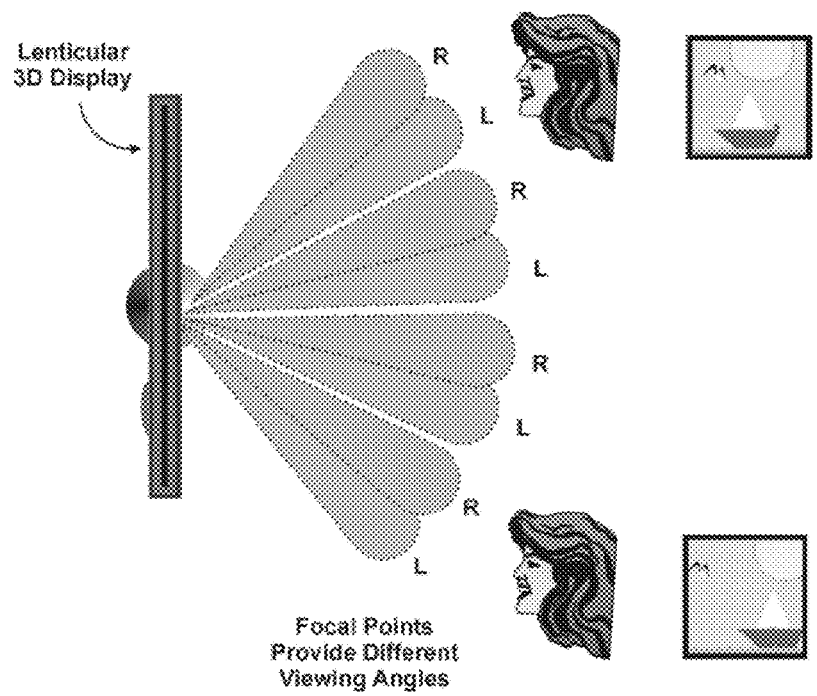
FIG. 14 shows a simplified model of a multiview autostereoscopic display.

More advanced approach for 3D vision in living rooms is having a multiview autostereoscopic display (ASD) that does not require glasses. ASD emits more than one view at a time but emitting is localized in the space in such a way, that a viewer sees only a stereo pair from a specific viewpoint as illustrated in FIG. 14. Moreover, a viewer is able see another stereo pair from different viewpoints, thus motion parallax viewing is supported if consecutive views are stereo pairs and arranged properly.

Some ASD technologies are capable of showing 52 or more different images at the same time, of which only a stereo pair is visible from a specific viewpoint. This supports multiuser 3D vision without glasses in a living room environment. Considering that ASD may require a large number of views as input, the total bitrate for such number of coded views may easily exceed constraints on transmitting channel bandwidth. In addition, the large number of views have to be captured, encoded and transmitted at the same time, which may be complex.

A more feasible solution for such multiview application may be by having limited number of input views, e.g. mono or stereo plus supplementary data, and to render (synthesize) all required views locally in the display. A depth image-based rendering (DIBR) is one of the technologies for view rendering. An implementation of DIBR takes a stereoscopic video and corresponding depth information with stereoscopic baseline b0 as input and synthesize unlimited number of virtual views between two input views with baseline (bi<b0). However, in order to enable DIBR-based multiview rendering, texture data should be available at the decoder side along with the corresponding depth data. A simplified model of such DIBR-based 3DV system is shown in FIG. 15.

Figure 15:
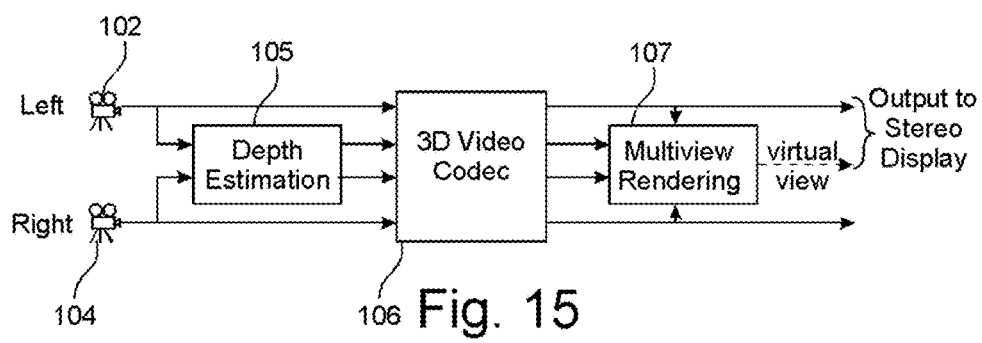
FIG. 15 depicts an example of a depth image-based rendering based 3D vision solution for multiview applications.

In the example system of FIG. 15 two capturing cameras 102, 104 are arranged in a 1D parallel configuration for stereoscopic image capturing. The depth estimator 105 produces a depth map. The captured images and the depth map are provided to the video coding process 106. The video coding process 106 may include encoding the input information, transmitting the encoded information and decoding the encoded information. From the video coding process 106 the multiview renderer 107 processes video information and the depth map and may provide a virtual view. Hence, one of the images captured by the cameras 102, 104 and the virtual view may be selected for output to a stereo display.

In such 3DV system, depth information is produced at the encoder side in a form of depth pictures (also known as depth maps) for each video frame. A depth map is an image with per-pixel depth information. Each sample in a depth map represents the distance of the respective texture sample from the plane on which the camera lies. In other words, if the z axis is along the shooting axis of the cameras (and hence orthogonal to the plane on which the cameras lie), a sample in a depth map represents the value on the z axis.

A depth map may also have higher spatial resolution, i.e. greater sample count than the respective texture image. In other words, a depth map may have sub-pixel accuracy with respect to the respective texture image.

Depth information can be obtained by various means. In one example, depth of the 3D scene is computed from the disparity registered by capturing cameras.

An example depth estimation algorithm takes stereoscopic view as an input, and computes local disparities between those two offset images. Each image is processed pixel by pixel in overlapped blocks, and for each block of pixels a horizontally localized search for matching block in the offset image is performed. Once a pixel-wise disparity is computed, the corresponding depth value z is calculated by equation (1).

$$z = \frac{f \cdot b}{d + \Delta d} \quad (1)$$

Terms f and b are camera focal length and the baseline distance between cameras, respectively. The term d is stated for disparity, which is observed between two cameras, and camera offset $\Delta d$ reflects a possible horizontal misplacement in optical centers of two cameras.

As for any block matching based algorithms, quality of depth-through-disparity estimation is content dependent and very often not accurate. For example no straightforward solution for depth estimation is possible for image fragments that are featuring very smooth areas with no textures or large level of noise.

In addition to this, one example algorithm estimates depth maps independently for each of input views, and taking into consideration the inaccuracy of the process, this could lead to a significant inconsistency in the resulting depth maps.

Alternatively or in addition, an infra red emitter and camera may be used and the time-of-flight principle may be used to derive the depth value.

In an example embodiment an illuminator produces an electromagnetic emission with intensity modulated with a frequency between e.g. 10-100 MHz, and an image sensor is modulated at the same frequency, synchronously sampling light reflected from objects in the scene. The distance to the object is represented as a phase shift in the illumination modulation, which can be determined from the sampled data substantially simultaneously for each pixel in the scene.

A time-of-flight camera may consists of the following components:

An illumination source illuminates the scene. As the light is modulated with high speed, LEDs or laser diodes are feasible. The illumination may use infrared light to make the illumination unobtrusive.

A lens gathers the reflected light and images the environment onto the image sensor. An optical band pass filter only passes the light with the same wavelength as the illumination unit. This helps to suppress background light.

In an image sensor each pixel may measure the time the light has taken to travel from the illumination unit to the object and back. Several different approaches may be used for timing.

Both the illuminator and the image sensor units may be controlled by synchronization signals.

In contrast to stereo, accuracy of time-of-flight-based depth estimation is mostly content independent, for example it is not suffering from lack of textural appearance in the content. However, time-of-flight cameras may have low pixel resolution sensors and the depth readings may be starkly influenced by random and systematic noise. Moreover, DIBR-based rendering assumes that depth map data is to be associated with texture data for every view. This means, that multiview capturing system will feature multiple time-of-flight cameras. Since each time-of-flight camera estimates depth value independently, this could lead to a significant inconsistency in the resulting depth maps for a multiview system design.

Depth maps and respective texture images may also be computer-generated.

However, once depth information is extracted at the encoder side, or provided by content producer, depth picture may be encoded along with the respective texture picture and transmitted to the decoder.

Disparity or parallax maps, such as parallax maps specified in ISO/IEC International Standard 23002-3, may be processed similarly to depth maps. Depth and disparity have a straightforward correspondence and they can be computed from each other through mathematical equation.

Depth-enhanced video refers to texture video having one or more views associated with depth video having one or more depth views. A number of approaches may be used for coding of depth-enhanced video, including the use of video plus depth (V+D), multiview video plus depth (MVD), and layered depth video (LDV). The depth map video stream for a single view may be regarded as a regular monochromatic video stream and coded with any video codec. The characteristics of the depth map stream, such as the minimum and maximum depth in world coordinates, can be indicated in messages formatted e.g. according to the MPEG-C Part 3 standard. In the video plus depth (V+D) representation, the depth picture sequence may be coded independently with any video codec, such as H.264/AVC, or included as auxiliary pictures within the same video bitstream as the texture video. In the MVD representation, the depth picture sequence for each texture view is coded with any video codec, such as MVC. In the LDV representation, the texture and depth of the central view are coded conventionally, while the texture and depth of the other views are partially represented and cover only the dis-occluded areas required for correct view synthesis of intermediate views.

Depth-enhanced video may be coded in a manner where texture and depth are coded independently of each other. For example, texture views may be coded as one MVC bitstream and depth views may be coded as another MVC bitstream. Alternatively depth-enhanced video may be coded in a manner where texture and depth are jointly coded. When joint coding texture and depth views is applied for a depth-enhanced video representation, some decoded samples of a texture picture or data elements for decoding of a texture picture are predicted or derived from some decoded samples of a depth picture or data elements obtained in the decoding process of a depth picture. Alternatively or in addition, some decoded samples of a depth picture or data elements for decoding of a depth picture are predicted or derived from some decoded samples of a texture picture or data elements obtained in the decoding process of a texture picture.

In the case of joint coding of texture and depth for depth-enhanced video, view synthesis can be utilized in the loop of the codec, thus providing view synthesis prediction (VSP). In VSP, a prediction signal, such as a VSP reference picture, is formed using a DIBR or view synthesis algorithm, utilizing texture and depth information. For example, a synthesized picture (i.e., VSP reference picture) may be introduced in the reference picture list in a similar way as it is done with interview reference pictures and inter-view only reference pictures. Alternatively or in addition, a specific VSP prediction mode for certain prediction blocks may be determined by the encoder, indicated in the bitstream by the encoder, and used as concluded from the bitstream by the decoder.

In MVC, both inter prediction and inter-view prediction use essentially the same motion-compensated prediction process. Inter-view reference pictures and inter-view only reference pictures are essentially treated as long-term reference pictures in the different prediction processes. Similarly, view synthesis prediction may be realized such a manner that it uses the essentially the same motion-compensated prediction process as inter prediction and inter-view prediction. To differentiate from motion-compensated prediction taking place only within a single view without any VSP, motion-compensated prediction that includes and is capable of flexibly selecting mixing inter prediction, inter-prediction, and/or view synthesis prediction is herein referred to as mixed-direction motion-compensated prediction.

At the decoder side, both texture and depth data of a depth-enhanced video bitstream may be decoded and may be utilized by depth-image based rendering (DIBR) algorithms for view synthesis.

ISO Base Media File Format

Available media file format standards include ISO base media file format (ISO/IEC 14496-12), MPEG-4 file format (ISO/IEC 14496-14, also known as the MP4 format), AVC file format (ISO/IEC 14496-15), 3GPP file format (3GPP TS 26.244, also known as the 3GP format), and DVB file format. The SVC and MVC file formats are specified as amendments to the AVC file format. The ISO file format is the base for derivation of all the above mentioned file formats (excluding the ISO file format itself). These file formats (including the ISO file format itself) are called the ISO family of file formats.

Figure 16:
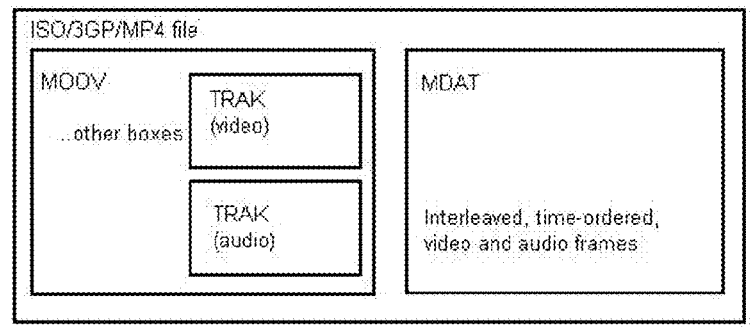
FIG. 16 shows a simplified file structure according to the ISO base media file format.

FIG. 16 shows a simplified file structure according to the ISO base media file format. The basic building block in the ISO base media file format is called a box. Each box has a header and a payload. The box header indicates the type of the box and the size of the box in terms of bytes. A box may enclose other boxes, and the ISO file format specifies which box types are allowed within a box of a certain type. Furthermore, some boxes are mandatorily present in each file, while others are optional. Moreover, for some box types, it is allowed to have more than one box present in a file. It may be concluded that the ISO base media file format specifies a hierarchical structure of boxes.

According to ISO family of file formats, a file includes media data and metadata that are enclosed in separate boxes, the media data (mdat) box and the movie (moov) box, respectively. For a file to be operable, both of these boxes should be present, unless media data is located in one or more external files and referred to using the data reference box as described subsequently. The movie box may contain one or more tracks, and each track resides in one track box. A track may be one of the following types: media, hint, timed metadata. A media track refers to samples formatted according to a media compression format (and its encapsulation to the ISO base media file format). A hint track refers to hint samples, containing cookbook instructions for constructing packets for transmission over an indicated communication protocol. The cookbook instructions may contain guidance for packet header construction and include packet payload construction. In the packet payload construction, data residing in other tracks or items may be referenced, i.e. it is indicated by a reference which piece of data in a particular track or item is instructed to be copied into a packet during the packet construction process. A timed metadata track refers to samples describing referred media and/or hint samples. For the presentation one media type, typically one media track is selected.

Samples of a track are implicitly associated with sample numbers that are incremented by 1 in the indicated decoding order of samples. The first sample in a track is associated with sample number 1. It is noted that this assumption affects some of the formulas below, and it is obvious for a person skilled in the art to modify the formulas accordingly for other start offsets of the sample number (such as 0).

Many files formatted according to the ISO base media file format start with a file type box, also referred to as the ftyp box. The ftyp box contains information of the brands labeling the file. The ftyp box includes one major brand indication and a list of compatible brands. The major brand identifies the most suitable file format specification to be used for parsing the file. The compatible brands indicate which file format specifications and/or conformance points the file conforms to. It is possible that a file is conformant to multiple specifications. All brands indicating compatibility to these specifications should be listed, so that a reader only understanding a subset of the compatible brands can get an indication that the file can be parsed. Compatible brands also give a permission for a file parser of a particular file format specification to process a file containing the same particular file format brand in the ftyp box.

It is noted that the ISO base media file format does not limit a presentation to be contained in one file, but it may be contained in several files. One file contains the metadata for the whole presentation. This file may also contain all the media data, whereupon the presentation is self-contained. The other files, if used, are not required to be formatted to ISO base media file format, are used to contain media data, and may also contain unused media data, or other information. The ISO base media file format concerns the structure of the presentation file only. The format of the media-data files is constrained the ISO base media file format or its derivative formats only in that the media-data in the media files is formatted as specified in the ISO base media file format or its derivative formats.

The ability to refer to external files is realized through data references as follows. The sample description box contained in each track includes a list of sample entries, each providing detailed information about the coding type used, and any initialization information needed for that coding. All samples of a chunk and all samples of a track fragment use the same sample entry. A chunk is a contiguous set of samples for one track. The Data Reference box, also included in each track, contains an indexed list of uniform resource locators (URLs), uniform resource numbers (URNs), and self-references to the file containing the metadata. A sample entry points to one index of the Data Reference box, hence indicating the file containing the samples of the respective chunk or track fragment.

Movie fragments may be used when recording content to ISO files in order to avoid losing data if a recording application crashes, runs out of disk, or some other incident happens. Without movie fragments, data loss may occur because the file format insists that all metadata (the Movie Box) be written in one contiguous area of the file. Furthermore, when recording a file, there may not be sufficient amount of Random Access Memory (RAM) or other read/write memory to buffer a Movie Box for the size of the storage available, and re-computing the contents of a Movie Box when the movie is closed is too slow. Moreover, movie fragments may enable simultaneous recording and playback of a file using a regular ISO file parser. Finally, smaller duration of initial buffering may be required for progressive downloading, i.e. simultaneous reception and playback of a file, when movie fragments are used and the initial Movie Box is smaller compared to a file with the same media content but structured without movie fragments.

The movie fragment feature enables to split the metadata that conventionally would reside in the moov box to multiple pieces, each corresponding to a certain period of time for a track. In other words, the movie fragment feature enables to interleave file metadata and media data. Consequently, the size of the moov box may be limited and the use cases mentioned above be realized.

The media samples for the movie fragments reside in an mdat box, as usual, if they are in the same file as the moov box. For the meta data of the movie fragments, however, a moof box is provided. It comprises the information for a certain duration of playback time that would previously have been in the moov box. The moov box still represents a valid movie on its own, but in addition, it comprises an mvex box indicating that movie fragments will follow in the same file. The movie fragments extend the presentation that is associated to the moov box in time.

Within the movie fragment there is a set of track fragments, zero or more per track. The track fragments in turn contain zero or more track runs, each of which document a contiguous run of samples for that track. Within these structures, many fields are optional and can be defaulted.

The metadata that may be included in the moof box is limited to a subset of the metadata that may be included in a moov box and is coded differently in some cases. Details of the boxes that may be included in a moof box may be found from the ISO base media file format specification.

A sample grouping in the ISO base media file format and its derivatives, such as the AVC file format and the SVC file format, is an assignment of each sample in a track to be a member of one sample group, based on a grouping criterion. A sample group in a sample grouping is not limited to being contiguous samples and may contain non-adjacent samples. As there may be more than one sample grouping for the samples in a track, each sample grouping has a type field to indicate the type of grouping. Sample groupings are represented by two linked data structures: (1) a SampleToGroup box (sbgp box) represents the assignment of samples to sample groups; and (2) a SampleGroupDescription box (sgpd box) contains a sample group entry for each sample group describing the properties of the group. There may be multiple instances of the SampleToGroup and SampleGroupDescription boxes based on different grouping criteria. These are distinguished by a type field used to indicate the type of grouping.

Figure 17:
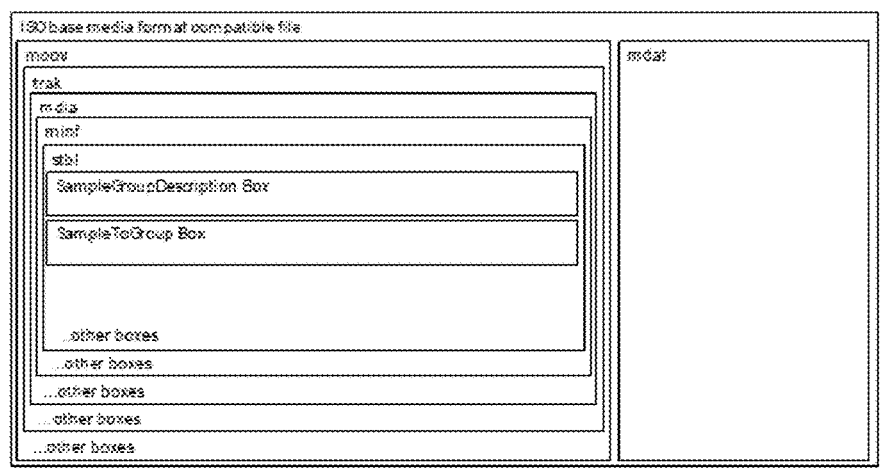
FIG. 17 provides a simplified box hierarchy indicating the nesting structure for the sample group boxes.

FIG. 17 provides a simplified box hierarchy indicating the nesting structure for the sample group boxes. The sample group boxes (SampleGroupDescription Box and SampleToGroup Box) reside within the sample table (stbl) box, which is enclosed in the media information (minf), media (mdia), and track (trak) boxes (in that order) within a movie (moov) box.

Figure 18:
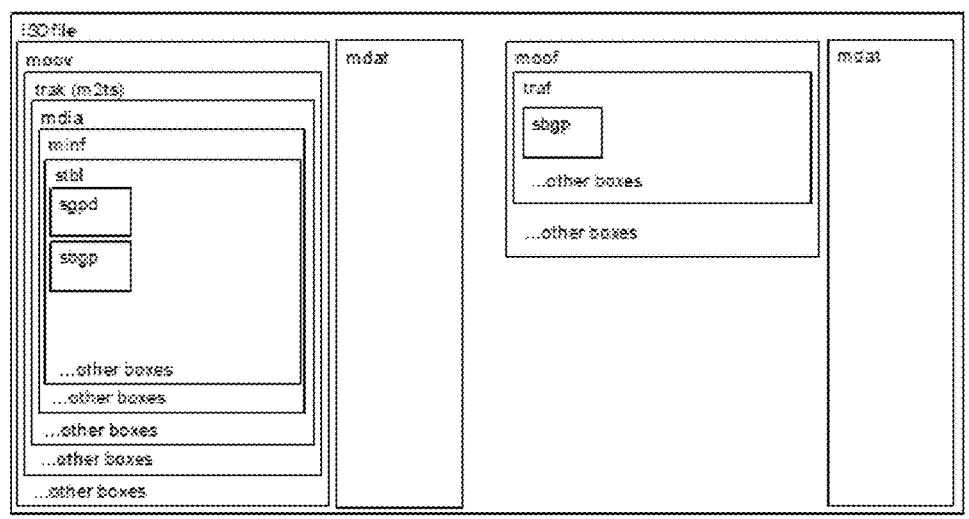
FIG. 18 illustrates an example of a file containing a movie fragment including a SampleToGroup box.

The SampleToGroup box is allowed to reside in a movie fragment. Hence, sample grouping may be done fragment by fragment. FIG. 18 illustrates an example of a file containing a movie fragment including a SampleToGroup box. It may be allowed to include the SampleGroupDescription Box to reside in movie fragments in addition to the sample table box.

For some coding systems a sync sample is specified to be a random access point after which all samples in decoding order can be correctly decoded. Sync samples may be indicated in the file format using a Sync Sample box or, if the samples are referred to by movie fragments, using the sample_is_non_sync_sample sample flag.

It may be possible to encode an "open" random access point, after which all samples in output order can be correctly decoded, but some samples following the random access point in decoding order and preceding the random access point in output order need not be correctly decodable. For example, an intra picture starting an open group of pictures can be followed in decoding order by (bi-)predicted pictures that however precede the intra picture in output order; though they possibly cannot be correctly decoded if the decoding starts from the intra picture, they are not needed. Such "open" random-access samples can be marked by being a member of 'rap' sample group specified in Amendment 3 of the ISO Base Media File Format (Edition 3). Samples marked by this group should be random access points, and may also be sync points (i.e. it is not required that samples marked by the sync sample table be excluded).

Video Transport

A real-time transport protocol (RTP) may be used for transmitting continuous media data, such as coded audio and video streams in Internet Protocol (IP) based networks. The Real-time Transport Control Protocol (RTCP) is a companion of RTP, i.e., RTCP should be used to complement RTP, when the network and application infrastructure allow its use. RTP and RTCP are usually conveyed over the User Datagram Protocol (UDP), which, in turn, is conveyed over the Internet Protocol (IP). RTCP is used to monitor the quality of service provided by the network and to convey information about the participants in an ongoing session. RTP and RTCP are designed for sessions that range from one-to-one communication to large multicast groups of thousands of end-points. In order to control the total bitrate caused by RTCP packets in a multiparty session, the transmission interval of RTCP packets transmitted by a single end-point is proportional to the number of participants in the session. Each media coding format has a specific RTP payload format, which specifies how media data is structured in the payload of an RTP packet.

A server or sender or transmitter sends the coded media bitstream using a communication protocol stack. The stack may include but is not limited to Real-Time Transport Protocol (RTP), User Datagram Protocol (UDP), and Internet Protocol (IP). The stack may also or instead include but is not limited to Hypertext Transfer Protocol (HTTP), Transmission Control Protocol (TCP), and IP. When the communication protocol stack is packet-oriented, the server encapsulates the coded media bitstream into packets. For example, when RTP is used, the server encapsulates the coded media bitstream into RTP packets according to an RTP payload format. Typically, each media type has a dedicated RTP payload format.

In the RTP payload format for SVC, a payload content scalability information (PACSI) NAL unit, is specified. The PACSI NAL unit, if present, is the first NAL unit in RTP packet payloads, which contain multiple NAL units, i.e. so-called aggregation packets. The PACSI NAL unit indicates characteristics that are common for all the remaining NAL units in the RTP payload.

In server-driven stream switching or bitrate adaptation, the server may determine a need for switching from one stream having certain characteristics to another stream having at least partly different characteristics on similar basis as in the client-driven stream switching as explained above. To assist the server, the client may provide indications to the server for example on the received bitrate or packet rate or on the buffer occupancy status of the client. RTCP can be used for such feedback or indications. For example, an RTCP extended report with receiver buffer status indications, also known as RTCP APP packet with client buffer feedback (NADU APP packet), has been specified in the 3GPP packet-switched streaming service.

Video transport and bitrate adaptation can also be client-driven, which is the case for example in the dynamic adaptive streaming over HTTP (DASH). MPEG DASH standard specifies formats that enable delivery of media content from standard HTTP servers to HTTP clients and enable caching of content by standard HTTP caches. MPEG DASH primarily defines two formats:

1. The Media Presentation Description (MPD) describes a Media Presentation, i.e. a bounded or unbounded presentation of media content. In particular, it defines formats to announce resource identifiers for Segments and to provide the context for these identified resources within a Media Presentation. In MPEG DASH, the resource identifiers are exclusively HTTP-URLs.

2. The Segment formats specify the formats of the entity body of the request response when issuing a HTTP GET request or a partial HTTP GET with the indicated byte range through HTTP/1.1 to a resource identified in the MPD.

MPEG DASH is intended to support a media streaming model in which control of the session lies exclusively with the client. Clients may request data using the HTTP protocol from standard web servers that have no DASH-specific capabilities. Consequently, MPEG DASH focuses not on client or server procedures but on the data formats used to provide a DASH presentation.

A DASH Media Presentation is described by a Media Presentation Description document. This describes a sequence of Periods in time. A Period typically represents a relatively long period of time during which a consistent set of encoded versions of the content is available i.e. the set of available bitrates, languages, captions, subtitles etc. does not change during a Period.

Within a Period, material is arranged into Adaptation Sets. An Adaptation Set represents a set of interchangeable encoded versions of some aspect of the content. For example there may be one Adaptation Set for the main video component and a separate one for the main audio component. If there is other material available, for example captions or audio descriptions, then these may each have a separate Adaptation Set. Material may also be provided in multiplexed form, in which case interchangeable versions of the multiplex may be described as a single Adaptation Set, for example an Adaptation Set containing both the main audio and main video for a Period.

An Adaptation Set contains a set of Representations. A Representation describes a particular encoded version of the content. Any single Representation within an Adaptation Set is sufficient to render the content. Typically, clients may switch from one representation to another representation during a Period in order to adapt to network conditions or other factors. Clients may also ignore Representations which rely on codecs they do not support or which are otherwise unsuitable.

Within a Representation, the content is divided in time into Segments. A Segment is the basic unit of data that is advertised in the Media Presentation Description. A URL is provided for each Segment meaning that a Segment is the largest unit of data that can be retrieved with a single HTTP request. This is not strictly true, since the MPD may also include a byte range with the URL, meaning that the Segment is contained in the provided byte range of some larger resource. A client device could in principle construct a single request for multiple Segments, but this might not be the typical case.

Segments can be of any duration. Typically all Segments in a Representation have the same or roughly similar duration. However, Segment duration may differ from Representation to Representation. A DASH presentation can be constructed with relative short segments (for example a few seconds), or longer Segments including a single Segment for the whole Representation.

Short Segments may be required in the case of live content, where there are restrictions on end-to-end latency. The duration of a Segment is typically a lower bound on the end-to-end latency. DASH does not support the possibility for Segments to be extended over time: a Segment is a complete and discrete unit that must be made available in its entirety.

Segments may further be subdivided into Subsegments each of which contains a number of complete access units. There may also be file-format-specific restrictions on sub-segment boundaries, for example in the ISO Base Media File Format a subsegment must contain a number of complete Movie Fragments. If a Segment is divided into Subsegments this division may be described by a compact Segment index, which provides the presentation time range in the Representation and corresponding byte range in the Segment occupied by each Subsegment. Clients may download this index in advance and then issue requests for individual Subsegments.

Clients may switch from one representation to another representation within an Adaptation Set at any point in the media. However, switching at arbitrary positions may be complicated because of coding dependencies within Representations and other factors. It is also desirable to avoid download of 'overlapping' data i.e. media for the same time period from multiple Representations. Usually, switching is simplest at a random access point in the new stream and to formalize requirements related to switching DASH defines a codec-independent concept of Stream Access Points of various types.

Segmentation and Subsegmentation may be performed in ways that make switching simpler. For example, in the very simplest cases each Segment or Subsegment begins with a random access point and the boundaries of Segments or Subsegments are aligned across the Representations of an Adaptation Set. In this case, switching Representation involves playing to the end of a (Sub)segment of one Representation and then playing from the beginning of the next (Sub)segment of the new Representation. The Media Presentation Description and Segment Index provide various indications which describe properties of the Representations that may make switching simpler. Profiles of this specification may then require these to be set in certain ways, making implementation of clients for those profiles simpler at the cost of requiring the media data to obey the indicated constraints.

For On-Demand services, the Media Presentation Description is a static document describing the various aspects of the MediaPresentation. All Segments of the Media Presentation are available on the server once any Segment is available. For live services, however, Segments become available with time as the content is produced. The Media Presentation Description may be updated regularly to reflect changes in the presentation over time, for example Segment URLs for new segments may be added to the MPD and those for old, no longer available Segments may be removed. However, if Segment URLs are described using a template, this updating may not be necessary except for some redundancy/failover models.

In the following some further examples of switching from one stream to another stream will be described in more detail. In receiver-driven stream switching or bitrate adaptation, which is used for example in adaptive HTTP streaming such as DASH, the client may determine a need for switching from one stream having certain characteristics to another stream having at least partly different characteristics for example on the following basis.

The client may estimate the throughput of the channel or network connection for example by monitoring the bitrate at which the requested segments are being received. The client may also use other means for throughput estimation. For example, the client may have information of the prevailing average and maximum bitrate of the radio access link, as determined by the quality of service parameters of the radio access connection. The client may determine the representation to be received based on the estimated throughput and the bitrate information of the representation included in the MPD. The client may also use other MPD attributes of the representation when determining a suitable representation to be received. For example, the computational and memory resources indicated to be reserved for the decoding of the representation should be such that the client can handle. Such computational and memory resources may be indicated by a level, which is a defined set of constraints on the values that may be taken by the syntax elements and variables of the standard (e g Annex A of the H.264/AVC standard).

In addition or instead, the client may determine the target buffer occupancy level for example in terms of playback duration. The target buffer occupancy level may be set for example based on expected maximum cellular radio network handover duration. The client may compare the current buffer occupancy level to the target level and determine a need for representation switching if the current buffer occupancy level significantly deviates from the target level. A client may determine to switch to a lower-bitrate representation if the buffer occupancy level is below the target buffer level subtracted by a certain threshold. A client may determine to switch to a higher-bitrate representation if the buffer occupancy level exceeds the target buffer level plus another threshold value.

A Stream Access Point (SAP) enables random access into a container of media stream(s), referred to as a Container Stream in this paragraph and below. A Container Stream may contain more than one media streams, each being an encoded version of continuous media of certain media type. A SAP is a position in a Container Stream enabling playback of a media stream to be started using only the information contained in the Container Stream starting from that position onwards and possibly initialization data from other part(s) of the Container Stream or available externally. Derived specifications should specify if initialization data is needed to access the Container Stream at a SAP and how the initialization data can be accessed.

For each SAP the properties, ISAP, TSAP, ISAU, TDEC, TEPT, and TPTF are identified and defined as:

TSAP is the earliest presentation time of any access unit of the media stream such that all access units of the media stream with presentation time greater than or equal to TSAP can be correctly decoded using data in the Bitstream starting at ISAP and no data before ISAP.

ISAP is the greatest position in the Bitstream such that all access units of the media stream with presentation time greater than or equal to TSAP can be correctly decoded using Bitstream data starting at ISAP and no data before ISAP.

ISAU is the starting position in the Bitstream of the latest access unit in decoding order within the media stream such that all access units of the media stream with presentation time greater than or equal to TSAP can be correctly decoded using this latest access unit and access units following in decoding order and no access units earlier in decoding order. In some embodiments ISAU is always greater than or equal to ISAP.

TDEC is the earliest presentation time of any access unit of the media stream that can be correctly decoded using data in the Bitstream starting at ISAU and no data before ISAU.

TEPT is the earliest presentation time of any access unit of the media stream starting at ISAU in the Bitstream.

TPTF is the presentation time of the first access unit of the media stream in decoding order in the Bitstream starting at ISAU.

Six types of SAPs are defined with properties as follows:
Type 1: TEPT=TDEC=TSAP=TPTF
Type 2: TEPT=TDEC=TSAP<TPTF
Type 3: TEPT<TDEC=TSAP<=TPTF
Type 4: TEPT<=TPTF<TDEC=TSAP
Type 5: TEPT=TDEC<TSAP
Type 6: TEPT<TDEC<TSAP Type 1 corresponds to what is known in some coding schemes as a "Closed GoP random access point" (in which all access units, in decoding order, starting from ISAP can be correctly decoded, resulting in a continuous time sequence of correctly decoded access units with no gaps) and in addition the access unit in decoding order is also the first access unit in presentation order.

Type 2 corresponds to what is know in some coding schemes as a "Closed GoP random access point", for which the first access unit in decoding order in the media stream starting from ISAU is not the first access unit in presentation order.

Type 3 corresponds to what is known in some coding schemes as an "Open GoP random access point", in which there are some access units in decoding order following ISAU that cannot be correctly decoded and have presentation times less than TSAP.

Type 4 corresponds to what is known in some coding schemes as an "Gradual Decoding Refresh (GDR) random access point", in which there are some access units in decoding order starting from and following ISAU that cannot be correctly decoded and have presentation times less than TSAP.

The Segment Index box specified for MPEG DASH segment formats documents the presence of Stream Access Points (SAPs) in the referenced subsegments. If a segment format based on the ISO Base Media File Format is used, a SAP of type 1 or type 2 is indicated as a sync sample by the sample_is_not_sync_sample flag equal to 0 in the movie fragment, and a SAP of type 3 is marked as a member of a sample group of type 'rap'.

Random Access in Video Coding

Random access in video coding refers to the ability of the decoder to start decoding a stream at a point other than the beginning of the stream and recover an exact or approximate representation of the decoded pictures.

A random access point or an entry point is here defined as a point in the bitstream where the decoding process can be initiated. A recovery point is defined as a point in the bitstream at which the recovery of an exact or an approximate representation of the decoded pictures represented by the bitstream may be achieved after a random access or broken link at the preceding random access point. A broken link is defined as a location in a bitstream at which it is indicated that some subsequent pictures in decoding order may contain serious visual artefacts due to unspecified operations performed in the generation of the bitstream. A broken link may result when a first sequence of coded pictures starting from an open GOP intra picture (see below) has been concatenated to a second sequence of coded pictures not originally preceding the first sequence of coded pictures. All decoded pictures at or subsequent to a recovery point in output order are correct or approximately correct in content. If the random access point is the same as the recovery point, the random access operation is instantaneous; otherwise, it is gradual and pictures between the random access point and the recovery point, in output order, might not be correct or approximately correct in content. A random access point may correspond to ISAP, ISAU, and TPTF in the definitions of SAPs above. In elementary video bitstreams ISAP and ISAU are typically the same, unless sequence or picture parameter sets or similar initialization information is not present at ISAU and is therefore pointed to by ISAP. The recovery point may correspond to TSAP.

Random access points enable seek, fast forward, and fast backward operations in locally stored video streams. In video on-demand streaming, servers can respond to seek requests by transmitting data starting from the random access point that is closest to the requested destination of the seek operation. Switching between coded streams of different bit-rates is a method that is used commonly in unicast streaming to match the transmitted bitrate to the expected network throughput and to avoid congestion in the network. Switching to another stream is possible at a random access point. Furthermore, random access points enable tuning in to a broadcast or multicast. In addition, a random access point can be coded as a response to a scene cut in the source sequence or as a response to an intra picture update request.

Conventionally each intra picture has been a random access point in a coded sequence. The introduction of multiple reference pictures for inter prediction caused that an intra picture may not be sufficient for random access. For example, a decoded picture before an intra picture in decoding order may be used as a reference picture for inter prediction after the intra picture in decoding order. Therefore, an IDR picture as specified in the H.264/AVC standard or an intra picture having similar properties to an IDR picture has to be used as a random access point. A closed group of pictures (GOP) is such a group of pictures in which all pictures can be correctly decoded. In H.264/AVC, a closed GOP may start from an IDR access unit (or from an intra coded picture with a memory management control operation marking all prior reference pictures as unused). In MVC extension of H.264/AVC, an IDR access unit includes IDR view components. An IDR view component of the base view is identical to a coded IDR picture of H.264/AVC, while IDR view components of non-base views may be inter-view predicted.

An open group of pictures (GOP) is such a group of pictures in which pictures preceding the initial intra picture in output order may not be correctly decodable but pictures following the initial intra picture in output order are correctly decodable. Different standards include mechanisms for indicating an intra picture starting an open GOP, including the following:

An H.264/AVC decoder can recognize an intra picture starting an open GOP from the recovery point SEI message in the H.264/AVC bitstream. When a recovery point SEI message is used, the random access point is the access unit containing the recovery point SEI message. The recovery point (of output pictures in output order) is indicated by the recovery_frame_cnt syntax element of the recovery point SEI message. All decoded pictures in output order are indicated to be correct or approximately correct in content starting at the output order position of the reference picture having the frame_num equal to the frame_num of the VCL NAL units for the current access unit incremented by recovery_frame_cnt in modulo MaxFrameNum arithmetic, where MaxFrameNum is the greatest allowed value of frame_num+1.

In MVC, an anchor picture is defined as a coded picture in which all slices may reference only slices within the same access unit, i.e., inter-view prediction may be used, but no inter prediction is used, and all following coded pictures in output order do not use inter prediction from any picture prior to the coded picture in decoding order. The value of anchor_pic_flag is equal to 1 for all the prefix NAL units (when present) and all the slice extension NAL units that are contained in an anchor picture. An anchor picture corresponds to the start of an open GOP in multiview coding.

In the draft High-Efficiency Video Coding (HEVC) standard, a NAL unit type has been dedicated to indicate slices of a Clean Random Access (CRA) picture, which is an intra picture starting an open GOP, and hence decoders can recognize the start of an open GOP from the dedicated NAL unit type. In HEVC, all coded pictures that follow the CRA picture both in decoding order and output order do not use inter prediction from any picture that precedes the CRA picture either in decoding order or output order; and any picture that precedes the CRA picture in decoding order also precedes the CRA picture in output order.

The pictures preceding, in output order, the initial intra picture starting an open GOP are referred to as leading pictures. There are two types of leading pictures: decodable and non-decodable. Decodable leading pictures are such that can be correctly decoded when the decoding is started from the initial intra picture starting the open GOP. In other words, decodable leading pictures use only the initial intra picture or subsequent pictures in decoding order as reference in inter prediction. Non-decodable leading pictures are such that cannot be correctly decoded when the decoding is started from the initial intra picture starting the open GOP. In other words, non-decodable leading pictures use pictures prior, in decoding order, to the initial intra picture starting the open GOP as references in inter prediction. Amendment 1 of the ISO Base Media File Format (Edition 3) includes support for indicating decodable and non-decodable leading pictures through the leading syntax element in the Sample Dependency Type box and the leading syntax element included in sample flags that can be used in track fragments.

It is noted that the term GOP is used differently in the context of random access than in the context of SVC. In SVC, a GOP refers to the group of pictures from a picture having temporal_id equal to 0, inclusive, to the next picture having temporal_id equal to 0, exclusive. In the random access context, a GOP is a group of pictures that can be decoded regardless of the fact whether any earlier pictures in decoding order have been decoded.

Gradual decoding refresh (GDR) refers to the ability to start the decoding at a non-IDR picture and recover decoded pictures that are correct in content after decoding a certain amount of pictures. That is, GDR can be used to achieve random access from non-intra pictures. Some reference pictures for inter prediction may not be available between the random access point and the recovery point, and therefore some parts of decoded pictures in the gradual decoding refresh period may not be reconstructed correctly. However, these parts are not used for prediction at or after the recovery point, which may result into error-free decoded pictures starting from the recovery point.

Gradual decoding refresh may be more cumbersome both for encoders and decoders compared to instantaneous decoding refresh. However, gradual decoding refresh may be desirable in error-prone environments thanks to two facts: First, a coded intra picture is generally considerably larger than a coded non-intra picture. This makes intra pictures more susceptible to errors than non-intra pictures, and the errors are likely to propagate in time until the corrupted macroblock locations are intra-coded. Second, intra-coded macroblocks are used in error-prone environments to stop error propagation. Thus, it makes sense to combine the intra macroblock coding for random access and for error propagation prevention, for example, in video conferencing and broadcast video applications that operate on error-prone transmission channels. This conclusion is utilized in gradual decoding refresh.

Gradual decoding refresh can be realized with the isolated region coding method. An isolated region in a picture can contain any macroblock locations, and a picture can contain zero or more isolated regions that do not overlap. A leftover region is the area of the picture that is not covered by any isolated region of a picture. When coding an isolated region, in-picture prediction is disabled across its boundaries. A leftover region may be predicted from isolated regions of the same picture.

A coded isolated region can be decoded without the presence of any other isolated or leftover region of the same coded picture. It may be necessary to decode all isolated regions of a picture before the leftover region. An isolated region or a leftover region contains at least one slice.

Pictures, whose isolated regions are predicted from each other, are grouped into an isolated-region picture group. An isolated region can be inter-predicted from the corresponding isolated region in other pictures within the same isolated-region picture group, whereas inter prediction from other isolated regions or outside the isolated-region picture group is not allowed. A leftover region may be inter-predicted from any isolated region. The shape, location, and size of coupled isolated regions may evolve from picture to picture in an isolated-region picture group.

An evolving isolated region can be used to provide gradual decoding refresh. A new evolving isolated region is established in the picture at the random access point, and the macroblocks in the isolated region are intra-coded. The shape, size, and location of the isolated region evolve from picture to picture. The isolated region can be inter-predicted from the corresponding isolated region in earlier pictures in the gradual decoding refresh period. When the isolated region covers the whole picture area, a picture completely correct in content may be obtained when decoding started from the random access point. This process can also be generalized to include more than one evolving isolated region that eventually cover the entire picture area.

There may be tailored in-band signaling, such as the recovery point SEI message, to indicate the gradual random access point and the recovery point for the decoder. Furthermore, the recovery point SEI message includes an indication whether an evolving isolated region is used between the random access point and the recovery point to provide gradual decoding refresh.

The use of IDR or anchor access units for random access in multiview video coding may cause that IDR or anchor access units are larger compared to other access units due to the intra-coded base-view view component and lack of inter prediction in the view components of the non-base view(s). The large size of IDR or anchor access units may cause various consequences, such as long initial buffering delay in the decoder, long end-to-end delay in live services, greater vulnerability to transmission errors, and difficulties in multiplexing several bitstreams into one multiplex of a constant bitrate. The client capabilities for access a broadcast/multicast service may be heterogeneous in terms of 2D/3D decoding and rendering capability. In many cases, 2D-capable clients may form a majority and hence a majority of users would benefit from an improved functionality in the base view, such as more frequent random access points, when compared to providing the functionality for non-base views or throughout all views. However, IDR or anchor access units may require equal random access capability to be provided across all views.

In some embodiments of the present invention, view random access (VRA) pictures or access units are coded into a multiview bitstream. VRA pictures enable starting the decoding of a subset of the views present in the bitstream. The views selected to be accessible in VRA pictures are alternated in successive VRA pictures so that all views are gradually reconstructed when two or more VRA pictures have been decoded. If multiview plus depth (MVD) or similar coding arrangement is used, the views that cannot be decoded before a sufficient number of VRA pictures have been received may be synthesized.

As inter prediction can be used for some view components of the VRA access unit, the compression efficiency of VRA access units is better than that of the anchor or IDR access units.

An encoder 300 according to some example embodiments may operate as follows and as depicted in the flow diagram of FIG. 8.

Figure 8:
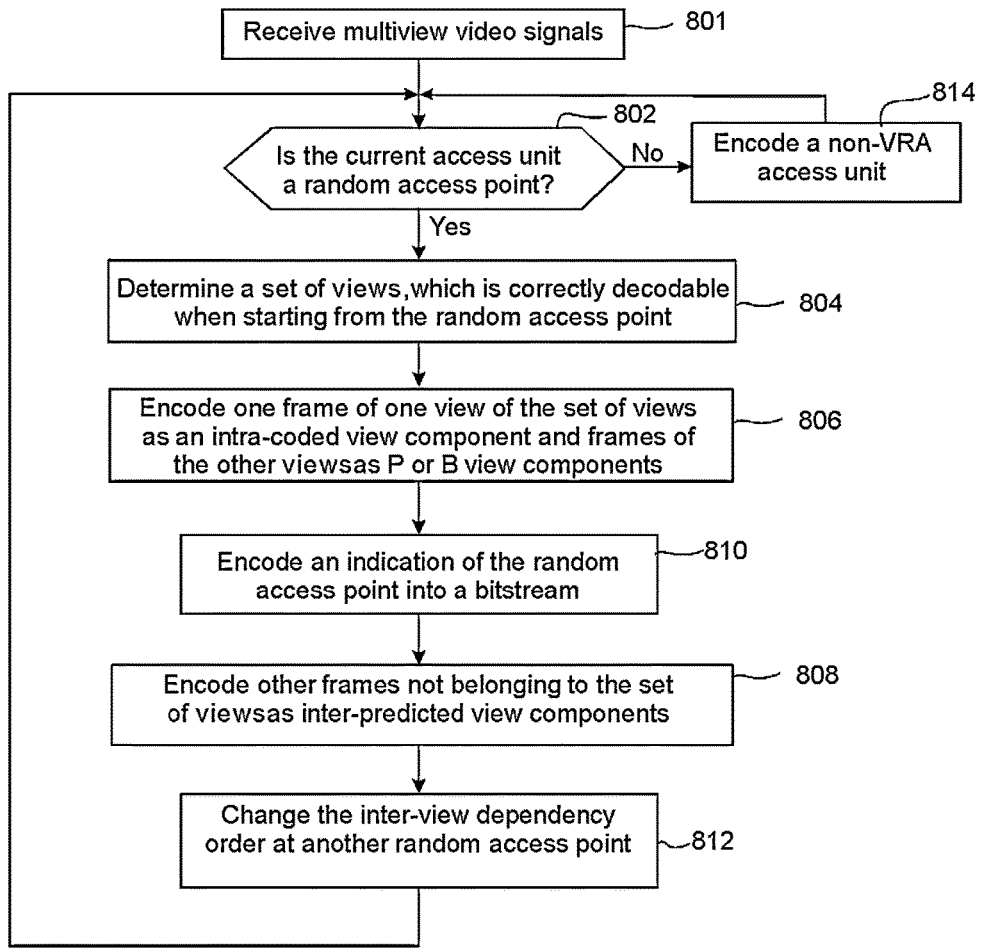
FIG. 8 is a flow diagram of the operation of an encoder according to an example embodiment.

The encoder 300 receives one or more video signals containing multiview image information for encoding (block 801 in FIG. 8). The multiview image information may have been captured, for example, by one or more cameras as frames. The image capturing and the encoding may be substantially simultaneous (real-time) processes or the image capturing may have previously been performed wherein the image information may have been stored to a memory, wherein the image information is retrieved from the memory and input to the encoder 300.

Figure 19A:
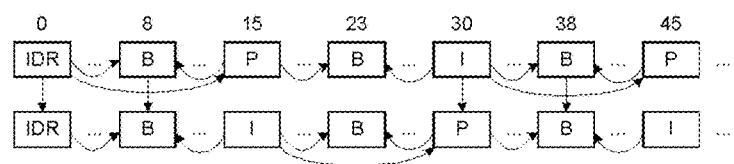
FIG. 19a illustrates an example of the coding scheme for stereoscopic coding.

The encoder 300 determines that a certain access unit is a random access point for the bitstream e.g. based on a pre-determined random access point frequency and that this certain access unit is to be coded as a VRA access unit (block 802 in FIG. 8). The encoder determines a set of views, referred to as view set A, which is correctly decodable when the decoding process is started from the VRA access unit being encoded (block 804). In the example of FIG. 19a such a view set for access unit 15 could contain the non-base view i.e. the bottom-most view in FIG. 19a. For access unit 30 of FIG. 19a, the base view could be determined as the view set A. Within the VRA access unit, the encoder codes one of these selected views in view set A as an intra-coded view component and the remaining of these selected views as P or B view components (806) that are predicted only from the previously coded view components of the selected views within the VRA access unit. In other words, the encoder encodes the selected views within the VRA access unit as if they belonged to an anchor access unit. The encoder may encode 808 the views that are not in view set A using inter prediction (in addition to potentially using inter-view prediction and view synthesis prediction). The encoder may also encode 810 an indication into the bitstream and/or within the packet encapsulation format and/or within the container file format to indicate the position of the VRA access unit and potentially also an indication which views are decodable when the decoding is started from the VRA access unit.

In some embodiments, the encoder may change 812 the inter-view prediction dependency order at a VRA access unit. The encoder may select the base view to contain the intra-coded view component of the VRA access unit. The encoder may indicate the changed inter-view dependency order within the bitstream using a particular syntax structure.

In some embodiments for MVD encoding, the encoder performs steps 804 to 812 for depth views (in addition to performing them for texture views). The encoder may select the respective depth views to be decodable starting from a particular VRA access unit as the texture views in view set A.

If it is determined that the current access unit is not a VRA access unit, the encoder encodes another type of an access unit than a VRA access unit (block 814 of FIG. 8). The encoder may encode for example an IDR access unit, an anchor access unit, or a non-anchor access unit. The encoder may encode access units subsequent to the VRA access unit in such a manner that view components with view set A are only predicted from view components in view set A, while view components not in view set A may be predicted from any views.

A decoder 400 according to some example embodiments may operate as follows and as depicted in the flow diagram of FIG. 9.

Figure 9:
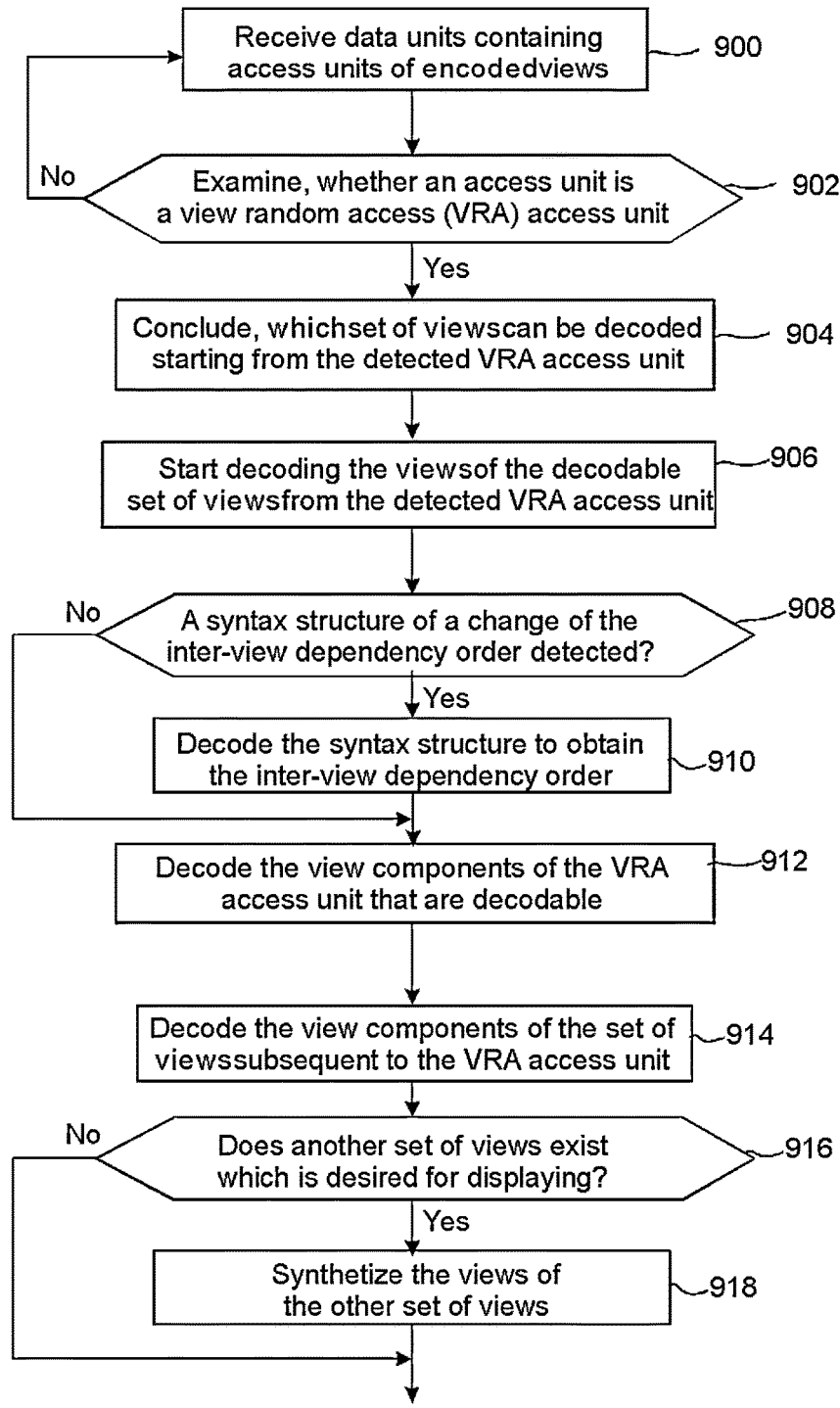
FIG. 9 is a flow diagram of the operation of a decoder according to an example embodiment.

The decoder 400 receives one or more bitstreams containing encoded access units of multiview image information (block 900 in FIG. 9).

The decoder 400 detects 902 a view random access (VRA) access unit using one of the indications in the bitstream, packet encapsulation format, or container file format. The decoder then concludes 904, which views can be decoded starting from the detected VRA access unit. For example, the decoder may use the view_id values in the MVC scalable nesting SEI message encapsulating a recovery point SEI message indicating a VRA access unit. The decoder starts the decoding of the bitstream from the detected VRA access unit (block 906 in FIG. 9).

In some embodiments, the decoder detects 908 and decodes 910 a syntax structure from the bitstream that indicates a changed inter-view dependency order. The inter-view dependency order is used for example in the initial reference picture list construction process.

The decoder decodes 912 the view components of the VRA access unit that are decodable when starting decoding from the VRA access unit (i.e. view set A). The decoder omits the decoding of other views that are present in the VRA access unit. The decoder decodes 914 view components of view set A from access units subsequent to the VRA access unit while the decoding of view components not in view set A is omitted.

In some embodiments for MVD decoding, the decoder may determine 916 a view set B that contains views that are desired for displaying but are not in view set A. The decoder may then synthesize 918 the views of the view set B using e.g. a DIBR algorithm and the texture and depth views of the view set A as an input to the DIBR algorithm. While blocks 916 and 918 are subsequent to block 914 in FIG. 9, in some embodiments blocks 916 and 918 may be performed for each access unit decoded in blocks 912 and 914 before decoding the next access unit in decoding order.

In the following some example FIGS. 19*a*-19*f* shall be described in more detail. In these figures 30 Hz input sequences and random access interval of 15 frames are assumed but it is obvious that also other kind of sequences and random access intervals are applicable as well. The access units are listed in output order from left to right. Hierarchical temporal scalability using a dyadic coding hierarchy is assumed, but not all access units are included in the figures for convenience.

FIG. 19*a* illustrates the coding scheme for stereoscopic coding compliant with MVC. The base view is on the top and the non-base view at the bottom.

As can be seen from the figure, inter-view prediction is enabled for frames 0 to 14 and 30 to 44, as indicated by the arrows from access units 0-14, 30-44 of the base view to temporally corresponding access units of the non-base view, while inter-view prediction is disabled for the other presented frames. Inter prediction is enabled for the base view of access units 15 and 45 and for the non-base view of access unit 30. This is illustrated with the arrow from the access unit 0 of the base view to the access unit 15 of the base view. and, respectively, with the arrow from the access unit 15 of the non-base view to the access unit 30 of the non-base view. Access units 15 and 45 are VRA access units enabling the starting of decoding of the non-base view, while access unit 30 is a VRA access unit enabling the starting of decoding of the base view.

Note that disabling of the inter-view prediction for the frames listed above is due to the compatibility with MVC, where the inter-view prediction dependencies have to stay unchanged within coded video sequences.

Figure 19B:
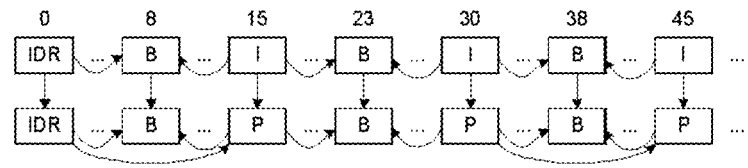
FIG. 19b illustrates another example of the coding scheme for stereoscopic coding.

FIG. 19*b* illustrates another realization of the planned coding scheme for stereoscopic coding compliant with MVC. The base view is on the top and the non-base view at the bottom.

As can be seen from the figure, every other random access position is a conventional anchor access unit, while every other random access position provides random access only to the base view.

Figure 19C:
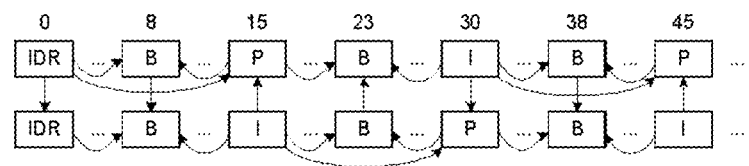
FIG. 19c illustrates a third example of the coding scheme for stereoscopic coding.

FIG. 19*c* illustrates the coding scheme for stereoscopic coding not compliant with MVC.

The inter-view prediction order and hence the base view alternates according to the VRA access units being coded. In access units 0 to 14, inclusive, the top view is the base view and the bottom view is inter-view-predicted from the top view. In access units 15 to 29, inclusive, the bottom view is the base view and the top-view is inter-view-predicted from the bottom view. Inter-view prediction order is alternated in successive access units similarly. The alternating inter-view prediction order causes the scheme to be non-conforming with MVC.

Figure 19D:
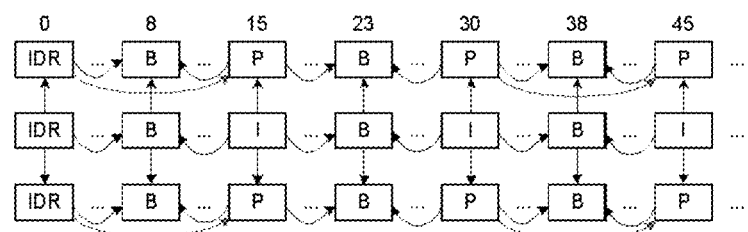
FIG. 19d illustrates an example of the coding scheme in a 3-view bitstream having picture-in-picture inter-view prediction hierarchy.

FIG. 19*d* illustrates one possibility to realize the coding scheme in a 3-view bitstream having a PIP inter-view prediction hierarchy, where the view in the middle is the base view and each of the other two views may be inter-view-predicted from the base view.

Note that no restrictions on inter-view coding compared to that of conventional coding for PIP inter-view prediction have to be made. The inter prediction is allowed for some temporal-level-0 frames in P views. As no changes to the inter-view prediction order are done in the middle of coded video sequences, the scheme is MVC compliant.

Figure 19E:
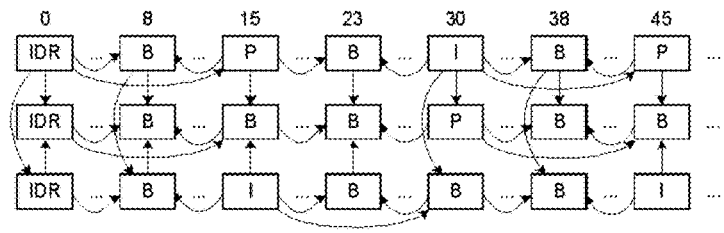
FIG. 19e illustrates an example of the coding scheme in a 3-view bitstream having IBP inter-view prediction hierarchy.

FIG. 19e illustrates one possibility to realize the coding scheme in a 3-view bitstream having an IBP inter-view prediction hierarchy, where the view on the top is the base view.

When views are numbered 0 to 2 from top to bottom, the following remarks can be made about inter-view and inter prediction.

In access units 15 to 29, inclusive, and 45 to 59, inclusive, inter-view prediction of view 2 is disabled to enable random access to view 2 at access units 15 and 45. In access units 15 and 45, inter prediction of views 0 and 1 is enabled.

In access unit 30, inter prediction of view 2 is enabled. Inter-view prediction of view 1 from view 2 is disabled to enable random access to views 0 and 1 at access unit 3.

Note that pictures marked as P (inter) coded may also be bi-predicted but then both reference blocks for bi-prediction of a block in the current picture originate from the same reference picture.

Figure 19F:
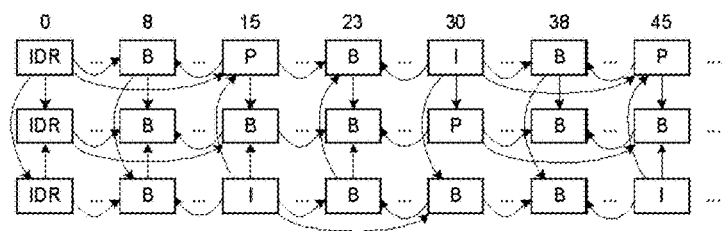
FIG. 19f illustrates an example of the coding scheme in a 3-view bitstream having IBP inter-view prediction hierarchy not compliant with MVC.

FIG. 19f illustrates one possibility to realize the coding scheme in a 3-view bitstream having IBP inter-view prediction hierarchy not compliant with MVC.

The inter-view prediction order and hence the base view alternates according to the VRA access units being coded. In access units 0 to 14, inclusive, view 0 is the base view and the view 2 is inter-view-predicted from the top view. In access units 15 to 29, inclusive, view 2 is the base view and view 0 is inter-view-predicted from view 2. Inter-view prediction order is alternated in successive access units similarly. The alternating inter-view prediction order causes the scheme to be non-conforming with MVC.

While FIGS. 19a-19e illustrated example embodiments when two or three views are coded, it is to be understood that various aspects of the invention are not limited to two or three views, but rather the illustrations in FIGS. 19a-19e are given to provide one possible basis on top of which the invention may be partly or fully realized for any number of views.

An encoder 300 according to another example embodiment of the invention may operate as follows. The encoder may determine a need for a random access AU for example based on the following reasons. The encoder may be configured to produce a constant or certain maximum interval between random access AUs. The encoder may detect a scene cut or other scene change e.g. by performing a histogram comparison of the sample values of consecutive pictures of the same view. Information about a scene cut can be received by external means, such as through an indication from a video editing equipment or software. The encoder may receive an intra picture update request or similar from a far-end terminal or a media gateway or other element in a video communication system. The encoder may receive feedback from a network element or a far-end terminal about transmission errors and concludes that intra coding may be needed to refresh the picture contents.

The encoder may determine which views are refreshed in the determined random access AU. A refreshed view may be defined to have the property that all pictures in output order starting from the recovery point can be correctly decodable when the decoding is started from the random access AU. The encoder may determine that a subset of the views being encoded is refreshed for example due to one or more of the following reasons. The encoder may determine the frequency or interval of anchor access unit or IDR access units and encode the remaining random access Ails as VRA access units. The estimated channel throughput or delay tolerates refreshing only a subset of the views. The estimated or received information of the far-end terminal buffer occupancy indicates that only a subset of the views can be refreshed without causing the far-end terminal buffer to drain or an interruption in decoding and/or playback to happen. The received feedback from the far-end terminal or a media gateway may indicate a need of or a request for updating of only a certain subset of the views. The encoder may optimize the picture quality for multiple receivers or players, only some of which are expected or known to start decoding from this random access AU. Hence, the random access AU need not provide perfect reconstruction of all views. The encoder may conclude that the content being encoded is only suitable for a subset of the views to be refreshed. For example, if the maximum disparity between views is small, it can be concluded that it is hardly perceivable if a subset of the views is refreshed. For example, the encoder may determine the number of refreshed views within a VRA access unit based on the maximal disparity between adjacent views and determine the refreshed views so that they have approximately equal camera separation between each other. The encoder may detect the disparity with any depth estimation algorithm. One or more stereo pairs can be used for depth estimation. Alternatively, the maximum absolute disparity may be concluded based on a known baseline separation of the cameras and a known depth range of objects in the scene.

The encoder may also determine which views are refreshed based on which views were refreshed in the earlier VRA access units. The encoder may choose to refresh views in successive VRA access units in an alternating or round-robin fashion. Alternatively, the encoder may also refresh the same subset of views in all VRA access units or may select the views to be refreshed according to a pre-determined pattern applied for successive VRA access units. The encoder may also choose to refresh views so that the maximal disparity of all the views refreshed in this VRA access unit compared to the previous VRA access unit is reduced in a manner that should be subjectively pleasant when decoding is started from the previous VRA access unit. This way the encoder may gradually refresh all the coded views. The encoder may indicate the first VRA access unit in a sequence of VRA access units with a specific indication.

The encoder allows inter prediction to those views in the VRA access unit that are not refreshed. The encoder disallows inter-view prediction from the non-refreshed views to refreshed views starting from the VRA access unit.

The encoder may create indications of the VRA access units into the bitstream as explained in details below. The encoder may also create indications which views are refreshed in a certain VRA access unit. Furthermore, the encoder may indicate leading pictures for VRA access units. Some example options for the indications are described below.

In some embodiments, the encoder may change the inter-view prediction order at a VRA access unit as illustrated in some of the example prediction hierarchies in FIGS. 19a-19e and explained below.

The encoder may use inter and inter-view prediction for encoding of view components for example as illustrated in FIGS. 19a-19e. When encoding depth-enhanced video, such as MVD, the encoder may use view synthesis prediction for encoding of view components whenever inter-view prediction could also be used.

Various MVD system design can be selected for deployment. In order to achieve a high coding efficiency, multiview textures and multiview depth data can be coded jointly. In such design, multiview texture and depth data representing a real scene in an approximately or exactly the same moment of time can be merged into a single access unit in order to enable such joint texture-depth view processing.

In depth-enhanced video, such as multiview video plus depth (MVD), the depth video pictures are usually encoded with the same inter and inter-view prediction references as the respective texture pictures. That is, the VRA access units of depth may concern the same views as the VRA access units of the respective texture video. Consequently, no separate indications for VRA access units of depth need necessarily be coded.

In some embodiments, the coded depth may have different view random access properties compared to the respective texture, and the encoder therefore may indicate depth VRA pictures in the bitstream. For example, a depth nesting SEI message or a specific depth SEI NAL unit type may be specified to contain SEI messages that only concern indicated depth pictures and/or views. A depth nesting SEI message may be used to contain other SEI messages, which were typically specified for texture views and/or single-view use. The depth nesting SEI message may indicate in its syntax structure the depth views for which the contained SEI messages apply to. The encoder may, for example, encode a depth nesting SEI message to contain a recovery point SEI message to indicate a VRA depth picture.

As a possible embodiment, coding of multiview textures is assisted with in-loop view synthesis prediction. Thus, some of texture and depth views belonging to the same access unit are utilized for purposes of prediction of another view of texture with help of in-loop view synthesis. A so-called view synthesis reference picture may be formed using a view synthesis process from one or more texture pictures and one or more depth pictures of the same access unit. The view synthesis reference picture may then be added to the reference picture list(s) and used as prediction reference in uni- or bi-prediction, or a specific prediction mode or modes may be specified for view synthesis prediction.

In hierarchical temporal coding, quantization parameter values may be cascaded so that temporal-level 0 has the lowest quantization parameter value (resulting into the best picture quality) and the highest temporal level has the greatest quantization parameter value. In one embodiment, the selection of temporal levels for texture and depth are not aligned. In other words, the same access unit contains texture view components of a certain temporal level and depth view components of another temporal level. Consequently, view synthesis reference pictures may have better quality when TLD<TLT, where TLD is the temporal level for depth and TLT for texture in the same access unit, when compared to coding where temporal levels of texture and depth are aligned in the same access unit. Intra-coded depth pictures may also have higher fidelity than uni- or bi-predicted depth pictures. Hence, view synthesis reference pictures generated from intra-coded depth pictures may have particularly good quality when compared to other view synthesis reference pictures.

Figure 20:
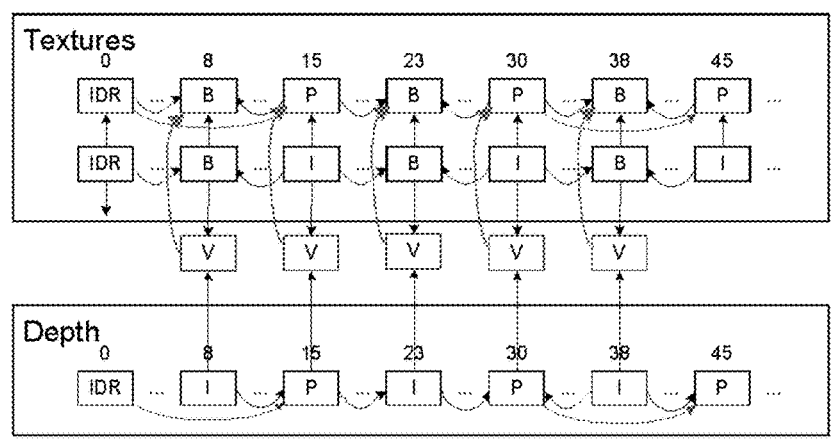
FIG. 20 illustrates an example of extension of the alternative random access to the MVD system with in-loop view synthesis.

An example depicted in FIG. 20 shows a possible extension of the alternative random access to the MVD system with in-loop view synthesis. The blocks marked with "V" are view synthesis reference frames, the quality of which are subject of both the quality of texture and the quality of depth pictures that belong to the same access unit. It may be possible to improve the quality of some texture pictures which are predicted from good-quality view synthesis reference pictures which may result when using intra-coded depth pictures and/or depth pictures for which TLD<TLT as input for view synthesis.

The encoder may generate an indication of a VRA access unit into the bitstream through various syntax elements including but not limited to the following. The encoder may generate a flag or other syntax element in the NAL unit header or in the slice header. The encoder may generate specific NAL unit type or a specific value or specific values of other syntax elements in the NAL unit header. The encoder may generate a flag or other syntax element in the picture header, a picture parameter set, a slice parameter set, a picture delimiter NAL unit, a prefix NAL unit, or other syntax structure that can be applied to a larger area than a single slice.

The encoder may also generate a recovery point SEI message encapsulated into the MVC scalable nesting SEI message. The MVC scalable nesting SEI message indicates the view_id values for which the contained SEI message applies to. When a recovery point SEI message is contained in an MVC scalable nesting SEI message, the semantics of the contained recovery point SEI message may be interpreted in such a manner that decoding of only the views indicated in the MVC scalable nesting SEI message are required to recovery the indicated views, i.e. no inter-view or view synthesis prediction takes place from other views than those indicated in the MVC scalable nesting SEI message. Hence, view-wise entry point (a.k.a. random access point) and recovery point information can be conveyed when a recovery point SEI message is encapsulated into a MVC scalable nesting SEI message.

The encoder may generate an MVC recovery point SEI message providing view-wise information of entry points (a.k.a. random access point) and recovery points.

More than one of the indications mentioned above can be used, for example it may be beneficial to have a flag indicating a VRA access unit in a high and easily accessible level of the syntax structure, such as NAL unit header, and another syntax structure, such as a SEI message, giving more information about the VRA access unit.

The encoder may also indicate leading pictures for a VRA access unit through various syntax elements. For leading pictures, the encoder may also indicate if they are decodable or non-decodable when starting the decoding from the VRA access unit. The encoder may also indicate view_id values or other view identifiers with leading pictures. One or more of the following syntax elements may be used:

1. A flag or other syntax element in the NAL unit header.
2. Specific NAL unit type or a specific value or specific values of other syntax elements in the NAL unit header.
3. A flag or other syntax element in the slice header.
4. A flag or other syntax element in the picture header, a picture parameter set, a slice parameter set, a picture delimiter NAL unit, a prefix NAL unit, or other syntax structure that can be applied to a larger area than a single slice.
5. A SEI message for leading picture indication, or a flag or a syntax element for indicating leading pictures as part of a SEI message.
6. Picture order count or presentation time or similar syntax element that indicates the presentation order or time of the access unit. Leading pictures are those that have a presentation time or order smaller than that of the VRA access unit.

In some embodiments, a VRA access unit has no leading pictures, i.e. all access units following, in decoding order, a VRA access also follow it in output order. Such VRA access units may be indicated with a different value or partly different value for the syntax elements when compared to the syntax element values for a VRA access unit having leading pictures.

Indications of a VRA access unit and leading pictures may also be generated by packetizers or file generators and indicated in the packet encapsulation format or file format. For example, VRA access units and leading pictures may be indicated as follows:

1. Within a PACSI NAL unit of an RTP payload format or other RTP payload format or RTP payload header structure.
2. Within the RTP header using for example the Marker bit or RTP payload header extension.
3. Using the 'rap' sample grouping for ISO Base Media File Format tracks that contain views having the same view random access and leading picture characteristics.
4. Using is leading sample dependency indication within the Sample Dependency Type box or sample flags for sample in movie fragments for ISO Base Media File Format tracks that contain views having the same view random access and leading picture characteristics.

In order to perform the view prediction order update, which may be required in the proposed scheme using an alternating base view, the information of view dependencies specified in Sequence Parameter Set has to be updated. As a new SPS is activated only in IDR pictures in H.264/AVC and its extensions, the view prediction order update may happen through a different mechanism from SPS. For example, a new NAL unit may be specified for a view prediction order update or a view prediction order update may be included in a prefix NAL unit. The syntax for the view prediction order update can be similar to that of the respective section in the sequence parameter set MVC extension, repeated for convenience below:

```
num_views_minus1
for( i = 0; i <= num_views_minus1; i++ )
    view_id[ i ]
for( i = 1; i <= num_views_minus1; i++ ) {
    num_anchor_refs_l0[ i ]
    for( j = 0; j < num_anchor_refs_l0[ i ]; j++ )
        anchor_ref_l0[ i ][ j ]
    num_anchor_refs_l1[ i ]
    for( j = 0; j < num_anchor_refs_l1[ i ]; j++ )
        anchor_ref_l1[ i ][ j ]
}
for( i = 1; i <= num_views_minus1; i++ ) {
    num_non_anchor_refs_l0[ i ]
    for( j = 0; j < num_non_anchor_refs_l0[ i ]; j++ )
        non_anchor_ref_l0[ i ][ j ]
    num_non_anchor_refs_l1[ i ]
    for( j = 0; j < num_non_anchor_refs_l1[ i ]; j++ )
        non_anchor_ref_l1[ i ][ j ]
}
```

When the encoder creates a VRA access unit where the view prediction order changes, it also creates the indication of the view prediction order update. When the decoder receives a view prediction order update indication within the bitstream, it updates the view order indexing accordingly as if a new sequence parameter set was activated. The coding/decoding of the base view is modified in such a manner that inter prediction reference pictures are those that have the same view_id as the picture being coded/decoded (and these reference pictures are not necessarily base view pictures). The coding/decoding of the other views is not changed compared to that of MVC except the update of the view prediction order.

A decoder 400 according some other example embodiments may operate as follows.

First, the decoder detects a VRA access unit using one of the indications in the bitstream, packet encapsulation format, or file format. The decoder then concludes, which views can be decoded starting from the detected VRA access unit. For example, the decoder may use the view_id values in the MVC scalable nesting SEI message encapsulating a recovery point SEI message indicating a VRA access unit. The decoder decodes the views that can be decoded from the VRA access unit. The decoder omits the decoding of other views that are present in the VRA access unit.

The decoder may determine which views are desired for displaying, for example based on the known characteristics of the display, the estimated or expected location of the viewers, and the characteristics of the coded multiview sequence, such as the maximum disparity between coded views, some characteristics of which can be obtained for example from the multiview acquisition information SEI message. If some of the views desired for displaying are not among those that can be decoded starting from the detected VRA access unit, the decoder may synthesize the missing views from those views that are available. For example, if the maximum disparity between coded views is estimated to create a clearly noticeable degradation to the perceived multiview picture quality, the decoder may synthesize such number of views that are estimated to provide sufficient perceived quality. If a depth-enhanced video format is used, the decoder may use both the texture and depth views for synthesis. If a multiview video format is used, the decoder may for example estimate the per-pixel disparity or depth of the decoded views and use that for synthesizing views needed for displaying. Alternatively, the decoder may display only those views that can be decoded and, for example, simply copy the available views to the displayed views that would not be available otherwise. Alternatively, the decoder may use some other means to synthesize the views that are not available. It has been observed that stereoscopic vision may mask the fact that some views are unavailable for a short duration after random access.

The decoder may detect leading pictures in the same view(s) that can be decoded in the VRA access unit using one of the indications in the bitstream, packet encapsulation format, or file format. The decoder may choose to decode those leading pictures that are decodable or it may choose to omit the decoding of them. The decoder may omit the decoding of the non-decodable leading pictures.

The decoder decodes those non-leading pictures that are in the same view(s) that can be decoded in the VRA access unit. The decoder may omit the decoding of pictures (i.e., view components) that are the other views until the next VRA/IDR/anchor access unit is detected. Alternatively, the decoder may decode the view components of the view(s) that cannot be decoded in the VRA access unit approximately correctly for example as follows. If a coded view component $v_1$ uses inter prediction from a reference picture that is not available, the decoder may synthesize a view component corresponding $v_1$ from certain decoded texture and depth view components of the same access unit. The synthesized view component $v_1$ may then be used as inter prediction reference for subsequent view components of the same view. In some embodiments, the encoder includes a decoding operation using $v_1$ instead of the correct decoded view component and the correctness of the subsequent decoded pictures is measured. The encoder may include an indication into the bitstream, such as an SEI message, whether it is suggested for the decoder to use $v_1$ when the correct decoded view component cannot be decoded. The SEI message may also indicate whether $v_1$ should not be used.

The decoder may determine which views are desired for displaying for access unit following the VRA access unit similarly to the determination of desired displayed views for the VRA access unit, i.e. for example based on the known characteristics of the display, the estimated or expected location of the viewers, and the characteristics of the coded multiview sequence, such as the maximum disparity between coded views. The decoder may then synthesize the views that are not available through decoding when the decoding started from the VRA access. The decoder may also gradually increase the number of synthesized views over a number of access units in output order.

When the next VRA/IDR/anchor access unit is detected, the decoder then concludes which views can be decoded starting from the newly detected VRA/IDR/anchor access unit and starts decoding of those views. Subsequent VRA/IDR/anchor access units are monitored/detected and decoding of new views is started like this until all views or all desired views are being decoded.

Frame packing may be used to construct a picture sequence containing pictures, each containing constituent pictures of a multiview (typically stereoscopic) sequence. Frame-packed video may be encoded using a conventional single-view video encoder. The frame-packed input pictures of the same time instant may for example have a side-by-side or top-bottom arrangement to contain stereoscopic pictures. A single bitstream is output from the single-view encoder. After decoding, the frame-packed decoded pictures should be unpacked for displaying on a multiview display.

An indication of the applied frame packing or tiling may be included in the bitstream. For example, the frame packing arrangement Supplemental Enhancement Information (SEI) message of H.264/AVC may be used. Alternatively, similar pieces of information as included in the frame packing SEI message may be included in other parts of the bitstream, such as a sequence parameter set, a picture parameter set, a video usability information (VUI) structure, a sequence header, a group of pictures header, a picture header, or a slice header.

An encoder according to some example embodiments may form an isolated-region picture group for each sequence of constituent pictures. For example, the left-view constituent pictures (e.g. on the left half of the picture in side-by-side frame packing arrangement) may form an isolated-region picture group, and the right-view constituent pictures may form another isolated region picture group. An encoder may indicate the presence of isolated region picture groups with an SEI message, such as the motion-constrained slice group set SEI message of H.264/AVC.

An encoder may code constituent pictures using intra mode in alternating manner. In other words, only one or any other subset of constituent pictures within a picture may be intra-coded. The encoding of subsequent constituent pictures representing the same view may be constrained so that they do not use inter prediction from pictures preceding, in decoding order or output order, the picture where the view was intra coded. The encoder may indicate view random access capability for a view in a frame-packed video through a SEI message. For example, a frame-packed nesting SEI message may be specified. The frame-packed nesting SEI message may be used to contain other SEI messages, which were typically specified for single-view non-frame-packed use. The frame-packed nesting SEI message may contain an indication to which constituent picture(s) or frame-packed view(s) it applies to and may contain SEI messages that apply only to the indicated constituent picture(s). The frame-packed nesting SEI message may then contain a recovery point SEI message indicating random access capability to the indicated view(s).

A decoder according to some example embodiments may operate otherwise similarly to above, but it may decode only the constituent pictures that are indicated to be decodable through the indications of view random access until all constituent pictures become decodable through subsequent view random access points or complete intra or IDR pictures.

Random accessible access units and hence VRA access units may be used e.g. in the following applications, services, and use cases.

Server-driven stream switching in unicast streaming. In streaming applications, the server often has multiple versions of the same content available, each version being encoded for a different bitrate and/or receiver characteristics. The server may determine an available throughput for example based on receiver feedback and switch streams at a VRA access unit. The server may packetize video according to the instructions provided in hint tracks.

A container file, such as a file formatted according to the ISO Base Media File Format, may be used to include or refer to a bitstream including a VRA access. There may be specific switching hint tracks or switching hint samples that describe the encapsulation of the VRA access unit and the subsequent access units until all views are decodable. A file generator for creating such hint tracks may operate essentially similar manner as a decoder according to the invention but instead of decoding, the file generator creates the switching hint samples. For example, the file generator may receive a bitstream containing a VRA access unit. The file generator may parse the bitstream to conclude access units in decoding order and generate one or more hint samples for packetization instructions of each access unit and include the hint samples into a hint track. The file generator may detect if an access unit is a VRA access unit and conclude which views are decodable when decoding is started from this VRA access unit (i.e. view set A). The file generator may generate a switching hint track for the detected VRA access unit. The file generator may generate hint samples for the switching hint tracks to include instructions to packetize only coded data of view set A while no instructions in the hint samples for the switching hint track are created to included coded data of views excluded from view set A into packets.

The random accessible access units may also be used in receiver-driven stream switching in unicast streaming. A receiver may determine to receive only a subset of available views, for example, based on the available display characteristics. Different views may be available through different Representations in a DASH session. VRA access units may therefore be regarded and marked as Stream Access Points (SAPs) in the Segment Index boxes and also considered as SAPs when determining the values of SAP related attributes in the MPD. VRA access units may also be used for Representation switching in DASH.

The random accessible access units may further be used in reception of a subset of views in unicast streaming. Among the 3D display solutions are multi-view autostereoscopic displays, where the views seen depend on the position of the viewer relative to the display, and stereoscopic displays requiring the use of polarizing or shutter glasses. Stereoscopic and conventional 2D displays can be equipped with head and gaze tracking solutions, for example, in order to interactively select the view or views being displayed and consequently improve the 3D immersion experience. The fact that a user is watching only a subset of views at any single time can be exploited in unicast streaming applications to decrease the required bandwidth for transmission. That is, only those views that the user is watching and the views that are required for correct decoding of the watched views have to be transmitted. VRA access units may be used for switching to a subset of views in a multiview bitstream.

A media aware network element (MANE), such as a gateway 140, may use VRA access units as follows. A MANE may operate by selectively forwarding coded data received from a sender 130 to one or more receivers 150. The MANE may conclude that there is a disruption in a coded data, for example, when a packet loss occurred, which may be concluded based on packet sequence numbers for example, or when a receiver has issued a seek or a trick play operation, which may be concluded based on presentation timestamps for example. After a disruption, the MANE may detect a VRA access unit from the coded data and conclude which views are decodable when decoding is started from this VRA access unit (i.e. view set A). The MANE may forward only coded data of view set A while coded data of views excluded from view set A is not forwarded until a subsequent VRA, IDR or anchor access unit is received. When the MANE operates like this, it may save network resources as well as avoid congestion and losses in the network connection between the MANE and the receiver. Furthermore, as the MANE does not forward coded data from views that are not decodable, receivers and/or decoders need not detect correctly decodable views.

Seeking, fast forward, and fast backward of a local multiview video file or a remote multiview video file are also possible applications for the use of random accessible access units. VRA access units may be detected at and after the seek position and decoding can be started from a subsequent VRA access unit that provides the decoding possibility of at least some desired views. For fast forward and fast backward operation, VRA access units provide the property of decoding of only a subset of the access units of the bitstream.

The coding scheme presented above may improve compression efficiency of multiview coding.

An example of an encoder block diagram

Figure 10:
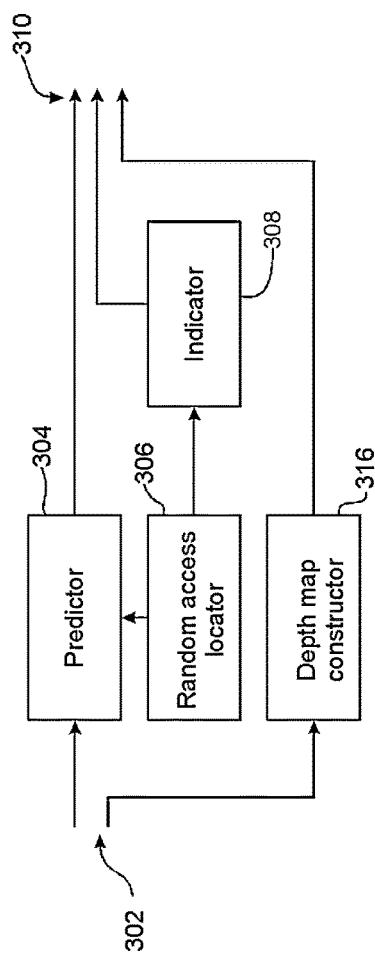
FIG. 10 depicts an encoder according to an example embodiment of the present invention.

FIG. 10 presents an example of an encoder realization according to an example embodiment of the invention. It presents a simplified block diagram, which may be generalized to more versatile coding schemes of essentially similar encoder structure. Each node or block in the block diagram is hereafter referred to as a process.

In the example embodiment of FIG. 10, the encoder 300 comprises an input 302 to receive image information for encoding. The encoder 300 may comprise a prediction element 304 adapted to produce predicted frames or blocks, e.g. inter-view, inter and/or intra predicted frames or blocks. The encoder 300 may further comprise a random access locating element 306 adapted to determine whether a view random access (VRA) access unit (AU) should be encoded to a multiview bitstream. The random access locating element 306 may then instruct the prediction element 304 to form a VRA AU on the basis of a subset of the views as was described above in connection with the description of the example embodiment of the encoding process depicted in FIG. 8. In the example embodiment of FIG. 10, the encoder 300 also comprises an indicator element 308 adapted to form an indication of the VRA AU. The indication may be added to the multiview bitstream or it may be added to a separate syntax element. The encoded bitstream(s) can be provided to the output 310 of the encoder 300.

The encoder 300 may also comprise a depth map constructing element 316 which may receive depth information from e.g. a distance detector (not shown) or from another appropriate element. The depth information may be received e.g. via the input 302. The depth map information may be provided to the output 310 of the encoder 300.

It should be noted here that the encoder 300 may also comprise other elements than presented above, or some of the elements, for example the indicator element 308, may not be present in each encoder implementation. Also the detailed structures of the elements of the encoder 300 may vary in different implementation and thus are not described in more detail here. Further, although the input 302 and output 310 are depicted with two or more lines in FIG. 10, different kinds of information need not be input/output via separate lines. For example, the encoded image information and other possible syntax elements and/or the depth map may be inserted into one bitstream, or they may be output as separate bitstreams.

An example of a decoder block diagram

Figure 11:
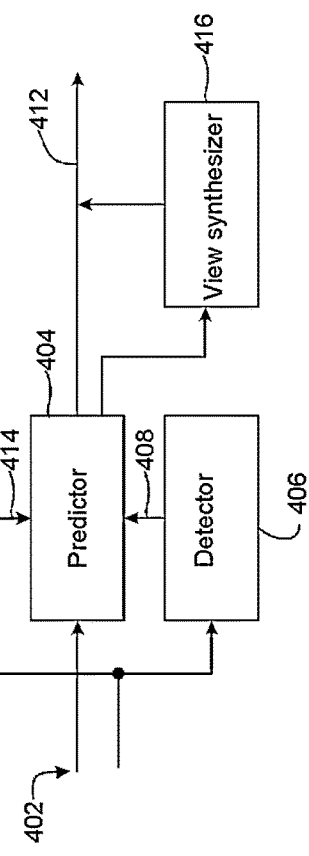
FIG. 11 depicts a decoder according to an example embodiment of the present invention.

FIG. 11 depicts a block diagram of an example embodiment of a decoder 400 according to the present invention.

In the example embodiment of FIG. 11, the decoder 400 comprises a first input 402 to receive encoded bitstream containing access units of multiview video. It should be noted that the encoded bitstream may be in different formats and may be received by a receiver, retrieved from a memory or provided by some other means to the decoder 400 for decoding. The decoder 400 further comprises a first detecting element 406 adapted to detect a view random access (VRA) access unit (AU) from the received bitstream. The decoder 400 also comprises a prediction element 404 adapted to reconstruct access units based on frames or blocks used as prediction references in the encoder process and some other information, such as prediction error coded in the received bitstream. The first detecting element 406 may provide an indication 408 to the prediction element 404 so that it can start decoding one or more view components from a detected VRA AU. The decoder 400 may further comprise a second detecting element 410 adapted to determine whether a change in the inter-view dependency order in the received encoded bitstream exists. The second detecting element 410 is then adapted to provide information 414 of the change in the inter-view dependency order to the prediction element 404. The decoded view components can be provided to the output 412 of the decoder 400.

The decoder 400 may comprise a synthesizing element 416 which is adapted to form a synthesized view when one or more views are not yet available for decoding or cannot be correctly decoded. The synthesizing element 416 may utilize other decoded view(s) and one or more depth maps which may have been received and decoded by the decoder 400.

It should be noted here that the decoder 400 may also comprise other elements than presented above, or some of the elements, for example the second detecting element 410, may not be present in each decoder implementation. Also the detailed structures of the elements of the decoder 400 may vary in different implementation and thus are not described in more detail here. Further, although the input 402 and output 412 are depicted with two or more lines in FIG. 11, different kinds of information need not be input/output via separate lines. For example, the encoded image information and indication on a VRA AU may be received in one bitstream.

Figure 4:
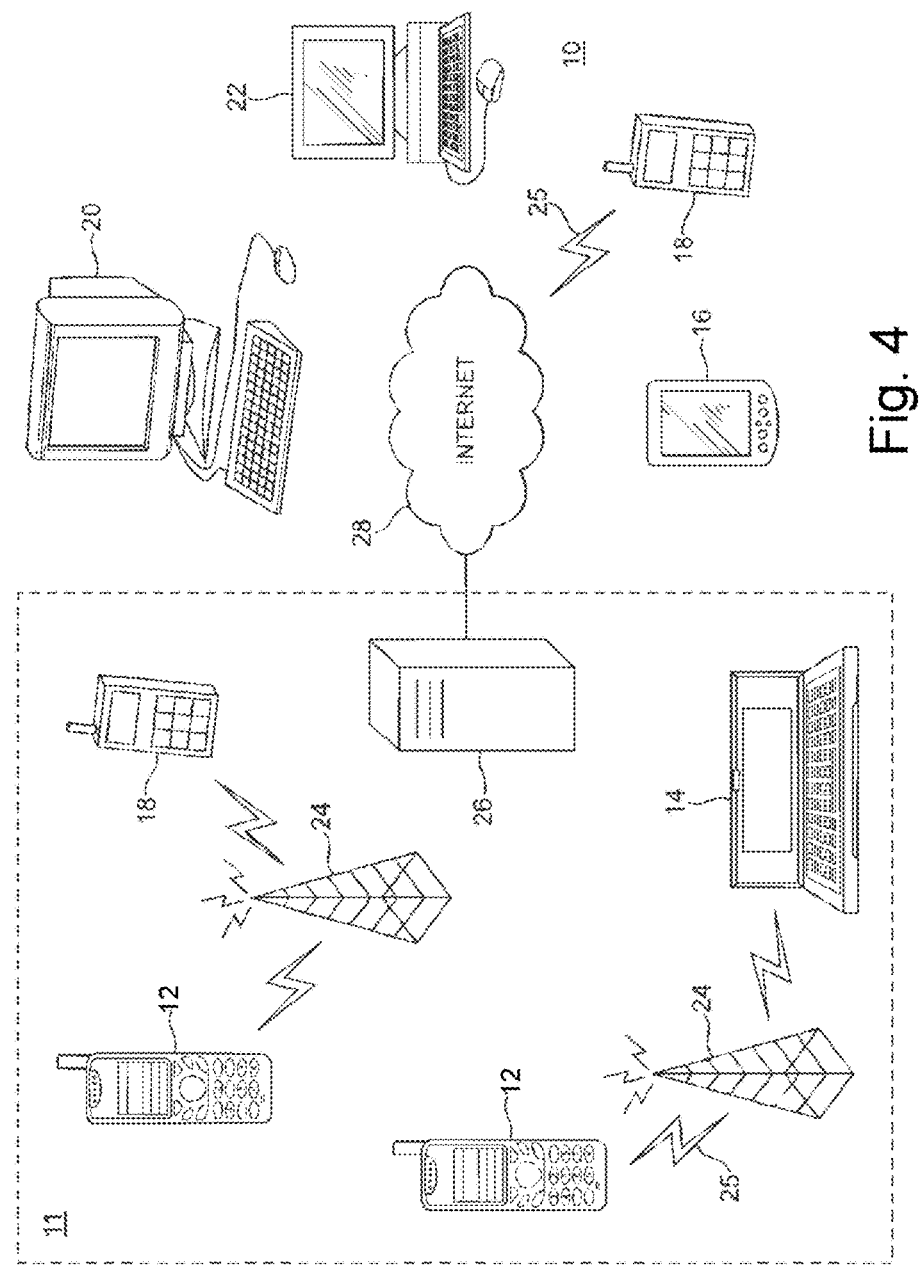
FIG. 4 is an overview diagram of a system within which various embodiments of the present invention may be implemented.

FIG. 4 shows a system 10 in which various embodiments of the present invention can be utilized, comprising multiple communication devices that can communicate through one or more networks. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 4 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, an electronic device 12 in the form of a mobile telephone, a combination personal digital assistant (PDA) and mobile telephone 14, a PDA 16, an integrated messaging device (IMD) 18, a desktop computer 20, a notebook computer 22, etc. The communication devices may be stationary or mobile as when carried by an individual who is moving. The communication devices may also be located in a mode of transportation including, but not limited to, an automobile, a truck, a taxi, a bus, a train, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device involved in implementing various embodiments of the present invention may communicate using various media including, but not limited to, radio, infrared, laser, cable connection, and the like.

Figure 6:
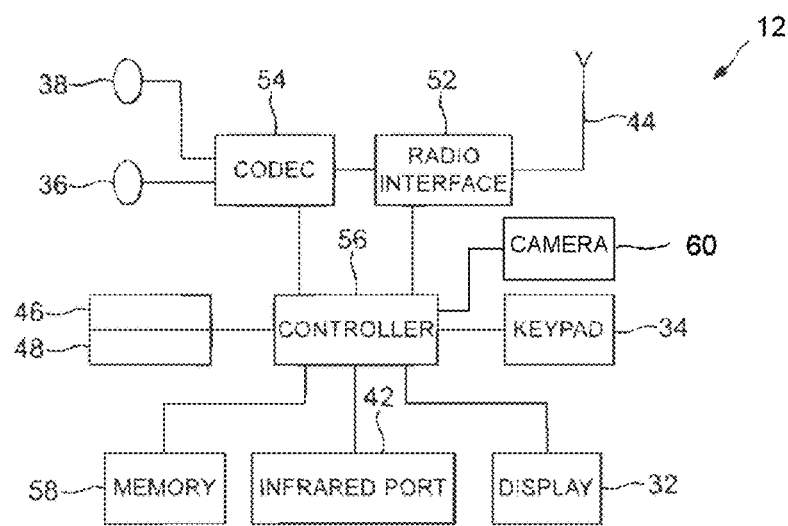
FIG. 6 is a schematic representation of the circuitry which may be included in the electronic device of FIG. 5.
Figure 5:
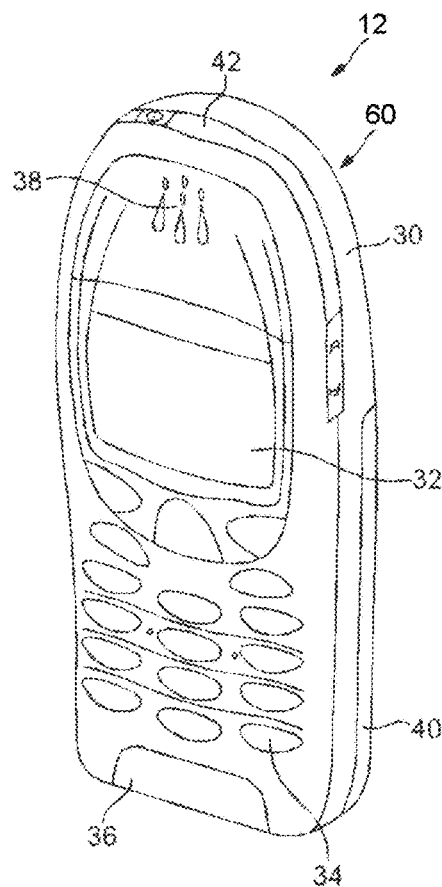
FIG. 5 illustrates a perspective view of an exemplary electronic device which may be utilized in accordance with the various embodiments of the present invention.

FIGS. 5 and 6 show one representative electronic device 28 which may be used as a network node in accordance to the various embodiments of the present invention. It should be understood, however, that the scope of the present invention is not intended to be limited to one particular type of device. The electronic device 28 of FIGS. 5 and 6 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment, a card reader 48, radio interface circuitry 52, codec circuitry 54, a controller 56 and a memory 58. The electronic device 28 may also include a camera 60. The above described components enable the electronic device 28 to send/receive various messages to/from other devices that may reside on a network in accordance with the various embodiments of the present invention. Individual circuits and elements are all of a type well known in the art, for example in the Nokia range of mobile telephones.

Figure 7:
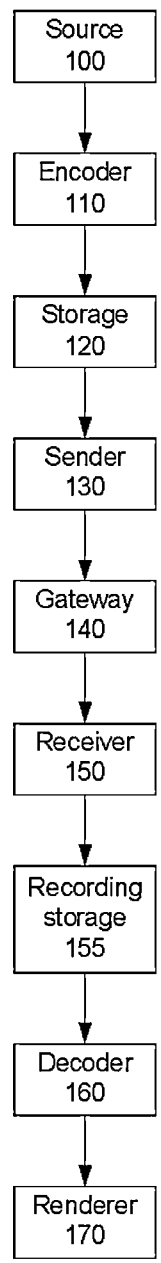
FIG. 7 is a graphical representation of a generic multimedia communication system within which various embodiments may be implemented.

FIG. 7 is a graphical representation of a generic multimedia communication system within which various embodiments may be implemented. As shown in FIG. 7, a data source 100 provides a source signal in an analog, uncompressed digital, or compressed digital format, or any combination of these formats. An encoder 110 encodes the source signal into a coded media bitstream. It should be noted that a bitstream to be decoded can be received directly or indirectly from a remote device located within virtually any type of network. Additionally, the bitstream can be received from local hardware or software. The encoder 110 may be capable of encoding more than one media type, such as audio and video, or more than one encoder 110 may be required to code different media types of the source signal. The encoder 110 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in FIG. 7 only one encoder 110 is represented to simplify the description without a lack of generality. It should be further understood that, although text and examples contained herein may specifically describe an encoding process, one skilled in the art would understand that the same concepts and principles also apply to the corresponding decoding process and vice versa.

The coded media bitstream is transferred to a storage 120. The storage 120 may comprise any type of mass memory to store the coded media bitstream. The format of the coded media bitstream in the storage 120 may be an elementary self-contained bitstream format, or one or more coded media bitstreams may be encapsulated into a container file. If one or more media bitstreams are encapsulated in a container file, a file generator (not shown in the figure) may used to store the one more more media bitstreams in the file and create file format metadata, which is also stored in the file. The encoder 110 or the storage 120 may comprise the file generator, or the file generator is operationally attached to either the encoder 110 or the storage 120. Some systems operate "live", i.e. omit storage and transfer coded media bitstream from the encoder 110 directly to the sender 130. The coded media bitstream is then transferred to the sender 130, also referred to as the server, on a need basis. The format used in the transmission may be an elementary self-contained bitstream format, a packet stream format, or one or more coded media bitstreams may be encapsulated into a container file. The encoder 110, the storage 120, and the server 130 may reside in the same physical device or they may be included in separate devices. The encoder 110 and server 130 may operate with live real-time content, in which case the coded media bitstream is typically not stored permanently, but rather buffered for small periods of time in the content encoder 110 and/or in the server 130 to smooth out variations in processing delay, transfer delay, and coded media bitrate.

The server 130 sends the coded media bitstream using a communication protocol stack. The stack may include but is not limited to Real-Time Transport Protocol (RTP), User Datagram Protocol (UDP), and Internet Protocol (IP). When the communication protocol stack is packet-oriented, the server 130 encapsulates the coded media bitstream into packets. For example, when RTP is used, the server 130 encapsulates the coded media bitstream into RTP packets according to an RTP payload format. Typically, each media type has a dedicated RTP payload format. It should be again noted that a system may contain more than one server 130, but for the sake of simplicity, the following description only considers one server 130.

If the media content is encapsulated in a container file for the storage 120 or for inputting the data to the sender 130, the sender 130 may comprise or be operationally attached to a "sending file parser" (not shown in the figure). In particular, if the container file is not transmitted as such but at least one of the contained coded media bitstream is encapsulated for transport over a communication protocol, a sending file parser locates appropriate parts of the coded media bitstream to be conveyed over the communication protocol. The sending file parser may also help in creating the correct format for the communication protocol, such as packet headers and payloads. The multimedia container file may contain encapsulation instructions, such as hint tracks in the ISO Base Media File Format, for encapsulation of the at least one of the contained media bitstream on the communication protocol.

The server 130 may or may not be connected to a gateway 140 through a communication network. The gateway 140 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. Examples of gateways 140 include MCUs, gateways between circuit-switched and packet-switched video telephony, Push-to-talk over Cellular (PoC) servers, IP encapsulators in digital video broadcasting-handheld (DVB-H) systems, or set-top boxes that forward broadcast transmissions locally to home wireless networks. When RTP is used, the gateway 140 may be called an RTP mixer or an RTP translator and may act as an endpoint of an RTP connection.

The system includes one or more receivers 150, typically capable of receiving, de-modulating, and de-capsulating the transmitted signal into a coded media bitstream. The coded media bitstream is transferred to a recording storage 155. The recording storage 155 may comprise any type of mass memory to store the coded media bitstream. The recording storage 155 may alternatively or additively comprise computation memory, such as random access memory. The format of the coded media bitstream in the recording storage 155 may be an elementary self-contained bitstream format, or one or more coded media bitstreams may be encapsulated into a container file. If there are multiple coded media bitstreams, such as an audio stream and a video stream, associated with each other, a container file is typically used and the receiver 150 comprises or is attached to a container file generator producing a container file from input streams. Some systems operate "live," i.e. omit the recording storage 155 and transfer coded media bitstream from the receiver 150 directly to the decoder 160. In some systems, only the most recent part of the recorded stream, e.g., the most recent 10-minute excerpion of the recorded stream, is maintained in the recording storage 155, while any earlier recorded data is discarded from the recording storage 155.

The coded media bitstream is transferred from the recording storage 155 to the decoder 160. If there are many coded media bitstreams, such as an audio stream and a video stream, associated with each other and encapsulated into a container file or a single media bitstream is encapsulated in a container file e.g. for easier access, a file parser (not shown in the figure) is used to decapsulate each coded media bitstream from the container file. The recording storage 155 or a decoder 160 may comprise the file parser, or the file parser is attached to either recording storage 155 or the decoder 160.

The coded media bitstream may be processed further by a decoder 160, whose output is one or more uncompressed media streams. Finally, a renderer 170 may reproduce the uncompressed media streams with a loudspeaker or a display, for example. The receiver 150, recording storage 155, decoder 160, and renderer 170 may reside in the same physical device or they may be included in separate devices.

It needs to be understood that different embodiments allow different parts to be carried out in different elements. For example, encoding and decoding of video may be carried out entirely in one user device like 12, 14, 16, 18, 20 or 22, or in one server device 26, or across multiple user devices or across multiple network devices, or across both user devices and network devices. For example, different views of the video may be stored in one device, the encoding of a stereo video for transmission to a user may happen in another device and the packetization may be carried out in a third device. As another example, the video stream may be received in one device, and decoded, and decoded video may be used in a second device to show a stereo video to the user. The video coding elements may be implemented as a software component residing on one device or distributed across several devices, as mentioned above, for example so that the devices form a so-called cloud.

The different embodiments may be implemented as software running on mobile devices and optionally on services. The mobile phones may be equipped at least with a memory, processor, display, keypad, motion detector hardware, and communication means such as 2G, 3G, WLAN, or other. The different devices may have hardware like a touch screen (single-touch or multi-touch) and means for positioning like network positioning or a global positioning system (GPS) module. There may be various applications on the devices such as a calendar application, a contacts application, a map application, a messaging application, a browser application, a gallery application, a video player application and various other applications for office and/or private use.

The decoder or the rendering unit or the display may include a depth-image-based rendering (DIBR) or view synthesis process. This process may input the decoded depth maps and texture pictures and synthesize pictures at virtual camera positions. View synthesis may be used to generate suitable views for a multi-view displays when the number of decoded views is not sufficient or their camera separation is inappropriate for the display. Alternatively or in addition, view synthesis may be used as so-called view synthesis prediction in the coding and decoding loop to create prediction references. Alternatively or in addition, view synthesis may be controlled by a user when he or she wants to adapt the disparity between displayed views to a comfortable value for viewing. View synthesis may also be used for other purposes and embodiments are not limited to be applied in conjunction with any particular use of view synthesis.

Some embodiments of the invention described above included a view synthesis or DIBR operation as part of the decoder apparatus. However, it would be appreciated that the view synthesis or DIBR operation may be coupled with an apparatus separate from the decoder apparatus, such as a rendering apparatus connected with the decoder apparatus with a fixed connection such as a High-Definition Multimedia Interface (HDMI) cable and connectors or a wireless connection such as a wireless local area network connection.

Some embodiments of the invention described above included a depth estimation or derivation operation as part of the encoder apparatus. However, it would be appreciated that the depth estimation or derivation may be coupled with an apparatus separate from the encoder apparatus, such as a capturing apparatus connected with the encoder apparatus with a fixed connection such as a High-Definition Multimedia Interface (HDMI) cable and connectors or a wireless connection such as a wireless local area network connection.

The embodiments of the invention described above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore in some embodiments of the invention the coder and decoder may share some or all common elements.

Although the above examples describe embodiments of the invention operating within a codec within an electronic device, it would be appreciated that the invention as described above may be implemented as part of any video codec. Thus, for example, embodiments of the invention may be implemented in a video codec which may implement video coding over fixed or wired communication paths.

Thus, user equipment may comprise a video codec such as those described in embodiments of the invention above.

It shall be appreciated that the term user equipment is intended to cover any suitable type of wireless user equipment, such as mobile telephones, portable data processing devices or portable web browsers.

It shall also be appreciated that the term user equipment is intended to cover any suitable type of non-portable user equipment, such as a television receiver, desk top data processing devices or set-top boxes.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

A method according to some example embodiments comprises:

encoding a first picture from a first sequence and a second picture from a second sequence into a first access unit of at least one bitstream;

determining a random access position for the at least one bitstream;

encoding a third picture from the first sequence and a fourth picture from the second sequence into a second access unit of the at least one bitstream, the second access unit following the random access position, the third picture being intra coded and the fourth picture being predicted from the second picture.

In some embodiments a prediction is used to encode a depth picture into the at least one bitstream.

In some embodiments the first sequence represents a first view and the second sequence represents a second view and the method further comprises determining a set of views to be correctly decodable when decoding is started from the random access position to comprise the first view.

In some embodiments the method further comprises:

encoding a fifth picture from a third sequence into the first access unit wherein the third sequence represents a third view; and encoding a sixth picture from the third sequence into the second access unit using prediction from the third picture.

In some embodiments the method further comprises encoding an indication of the random access position into the at least one bitstream.

In some embodiments said encoding of the first picture comprises prediction from the second picture.

In some embodiments wherein a first inter-view prediction order indicates the prediction of the first view from the second view in the first access unit and a second inter-view prediction order indicates the prediction of the second view from the first view, the method further comprises encoding an indication of the change of the inter-view prediction dependency order into the at least one bitstream.

In some embodiments pictures of the first sequence is captured by a first camera and the second sequence is captured by a second camera.

An apparatus according to some example embodiments comprises at least one processor, and at least one memory including computer program code, the at least one memory and the computer program code configured to, with the at least one processor, cause the apparatus to:

encode a first picture from a first sequence and a second picture from a second sequence into a first access unit of at least one bitstream;

determine a random access position for the at least one bitstream; and encode a third picture from the first sequence and a fourth picture from the second sequence into a second access unit of the at least one bitstream, the second access unit following the random access position, the third picture being intra coded and the fourth picture being predicted from the second picture.

In some embodiments the at least one memory includes computer program code, the at least one memory and the computer program code being configured to, with the at least one processor, cause the apparatus to use prediction to encode a depth picture into the at least one bitstream.

In some embodiments the first sequence represents a first view and the second sequence represents a second view and the at least one memory includes computer program code, the at least one memory and the computer program code being configured to, with the at least one processor, cause the apparatus to use prediction to determine a set of views to be correctly decodable when decoding is started from the random access position to comprise the first view.

In some embodiments the at least one memory includes computer program code, the at least one memory and the computer program code being configured to, with the at least one processor, cause the apparatus to use prediction to:

encode a fifth picture from a third sequence into the first access unit wherein the third sequence represents a third view; and encode a sixth picture from the third sequence into the second access unit using prediction from the third picture.

In some embodiments the at least one memory includes computer program code, the at least one memory and the computer program code being configured to, with the at least one processor, cause the apparatus to use prediction to encode an indication of the random access position into the at least one bitstream.

In some embodiments said encoding of the first picture comprises prediction from the second picture.

In some embodiments wherein a first inter-view prediction order indicates the prediction of the first view from the second view in the first access unit and a second inter-view prediction order indicates the prediction of the second view from the first view, the at least one memory includes computer program code, the at least one memory and the computer program code being configured to, with the at least one processor, cause the apparatus to use prediction to encode an indication of the change of the inter-view prediction dependency order into the at least one bitstream.

In some embodiments the apparatus is an encoder.

In some embodiments the apparatus is a wireless communication device.

In some embodiments the apparatus is a server.

According to some example embodiments there is provided a computer program embodied on a non-transitory computer readable medium, the computer program comprising instructions causing, when executed on at least one processor, at least one apparatus to encode a first picture from a first sequence and a second picture from a second sequence into a first access unit of at least one bitstream;

determine a random access position for the at least one bitstream;

encode a third picture from the first sequence and a fourth picture from the second sequence into a second access unit of the at least one bitstream, the second access unit following the random access position, the third picture being intra coded and the fourth picture being predicted from the second picture.

In some embodiments the computer program comprises instructions causing, when executed on at least one processor, the at least one apparatus to use prediction to encode a depth picture into the at least one bitstream.

In some embodiments the first sequence represents a first view and the second sequence represents a second view and the at least one memory includes computer program code, the at least one memory and the computer program comprising instructions causing, when executed on at least one processor, the at least one apparatus to use prediction to determine a set of views to be correctly decodable when decoding is started from the random access position to comprise the first view.

In some embodiments the computer program comprises instructions causing, when executed on at least one processor, the at least one apparatus to use prediction to:

encode a fifth picture from a third sequence into the first access unit wherein the third sequence represents a third view; and encode a sixth picture from the third sequence into the second access unit using prediction from the third picture.

In some embodiments the computer program comprises instructions causing, when executed on at least one processor, the at least one apparatus to use prediction to encode an indication of the random access position into the at least one bitstream.

In some embodiments said encoding of the first picture comprises prediction from the second picture.

In some embodiments wherein a first inter-view prediction order indicates the prediction of the first view from the second view in the first access unit and a second inter-view prediction order indicates the prediction of the second view from the first view, the computer program comprising instructions causing, when executed on at least one processor, the at least one apparatus to use prediction to encode an indication of the change of the inter-view prediction dependency order into the at least one bitstream.

A method according to some example embodiments comprises:

concluding a first random access position from at least one bitstream, the first random access position being followed by a first access unit comprising a first coded picture from a first view and a second coded picture from a second view, the first coded picture being intra coded and the second coded picture being predicted from a picture preceding the random access position;

starting the decoding from the first random access position;

decoding the first coded picture;

decoding one or more subsequent coded pictures from the first view.

In some example embodiments a second random access position is concluded from the at least one bitstream, the second random access position being followed by a second access unit comprising a third coded picture from the first view and a fourth coded picture from the second view, the fourth coded picture being intra coded;

decoding the third coded picture; and decoding the fourth coded picture.

In some embodiments a depth picture is decoded from the at least one bitstream.

In some embodiments the first sequence represents a first view and the second sequence represents a second view and the method further comprises determining a set of views to be correctly decodable when decoding is started from the random access position.

In some embodiments the method further comprises decoding an indication of the random access position from the at least one bitstream.

In some embodiments wherein a first inter-view prediction order indicates the prediction of the first view from the second view in the first access unit and a second inter-view prediction order indicates the prediction of the second view from the first view, the method further comprises decoding an indication of the change of the inter-view prediction dependency order from the at least one bitstream.

In some embodiments the first random access position is used to switch from another at least one bitstream to the at least one bitstream.

In some embodiments the first random access position is used to switch from the second view to the first view.

In some embodiments pictures of the first sequence is captured by a first camera and the second sequence is captured by a second camera.

An apparatus according to some example embodiments comprises at least one processor, memory including computer program code, the memory and the computer program code configured to, with the at least one processor, cause the apparatus to conclude a first random access position from at least one bitstream, the first random access position being followed by a first access unit comprising a first coded picture from a first view and a second coded picture from a second view, the first coded picture being intra coded and the second coded picture being predicted from a picture preceding the random access position;

start the decoding from the first random access position;

decode the first coded picture;

decode one or more subsequent coded pictures from the first view.

In some example embodiments the at least one memory includes computer program code, the at least one memory and the computer program code being configured to, with the at least one processor, cause the apparatus to conclude a second random access position from the at least one bitstream, the second random access position being followed by a second access unit comprising a third coded picture from the first view and a fourth coded picture from the second view, the fourth coded picture being intra coded;

decode the third coded picture; and decode the fourth coded picture.

In some embodiments the at least one memory includes computer program code, the at least one memory and the computer program code being configured to, with the at least one processor, cause the apparatus to decode a depth picture from the at least one bitstream.

In some embodiments the first sequence represents a first view and the second sequence represents a second view and the at least one memory includes computer program code, the at least one memory and the computer program code being configured to, with the at least one processor, cause the apparatus to determine a set of views to be correctly decodable when decoding is started from the random access position.

In some embodiments the at least one memory includes computer program code, the at least one memory and the computer program code being configured to, with the at least one processor, cause the apparatus to decode an indication of the random access position from the at least one bitstream.

In some embodiments wherein a first inter-view prediction order indicates the prediction of the first view from the second view in the first access unit and a second inter-view prediction order indicates the prediction of the second view from the first view, the at least one memory includes computer program code, the at least one memory and the computer program code being configured to, with the at least one processor, cause the apparatus to decode an indication of the change of the inter-view prediction dependency order from the at least one bitstream.

In some embodiments the at least one memory includes computer program code, the at least one memory and the computer program code being configured to, with the at least one processor, cause the apparatus to use the first random access position to switch from another at least one bitstream to the at least one bitstream.

In some embodiments the at least one memory includes computer program code, the at least one memory and the computer program code being configured to, with the at least one processor, cause the apparatus to use the first random access position to switch from the second view to the first view.

In some embodiments the at least one memory includes computer program code, the at least one memory and the computer program code being configured to, with the at least one processor, cause the apparatus to capture pictures of the first sequence by a first camera and to capture the second sequence by a second camera.

In some embodiments the apparatus is a decoder.

In some embodiments the apparatus is a wireless communication device.

In some embodiments the apparatus is a client device.

A computer program embodied on a non-transitory computer readable medium, the computer program according to some example embodiments comprises instructions causing, when executed on at least one processor, at least one apparatus to conclude a first random access position from at least one bitstream, the first random access position being followed by a first access unit comprising a first coded picture from a first view and a second coded picture from a second view, the first coded picture being intra coded and the second coded picture being predicted from a picture preceding the random access position;

start the decoding from the first random access position;

decode the first coded picture;

decode one or more subsequent coded pictures from the first view.

In some example embodiments the computer program comprises instructions causing, when executed on at least one processor, the at least one apparatus to conclude a second random access position from the at least one bitstream, the second random access position being followed by a second access unit comprising a third coded picture from the first view and a fourth coded picture from the second view, the fourth coded picture being intra coded;

decode the third coded picture; and decode the fourth coded picture.

In some embodiments the computer program comprises instructions causing, when executed on at least one processor, the at least one apparatus to decode a depth picture from the at least one bitstream.

In some embodiments the first sequence represents a first view and the second sequence represents a second view and the at least one memory includes computer program code, the at least one memory and the computer program comprises instructions causing, when executed on at least one processor, the at least one apparatus to determine a set of views to be correctly decodable when decoding is started from the random access position.

In some embodiments the at least one memory includes computer program code, the at least one memory and the computer program code being configured to, with the at least one processor, cause the apparatus to decode an indication of the random access position from the at least one bitstream.

In some embodiments wherein a first inter-view prediction order indicates the prediction of the first view from the second view in the first access unit and a second inter-view prediction order indicates the prediction of the second view from the first view, the computer program comprises instructions causing, when executed on at least one processor, the at least one apparatus to decode an indication of the change of the inter-view prediction dependency order from the at least one bitstream.

In some embodiments the computer program comprises instructions causing, when executed on at least one processor, the at least one apparatus to use the first random access position to switch from another at least one bitstream to the at least one bitstream.

In some embodiments the computer program comprises instructions causing, when executed on at least one processor, the at least one apparatus to use the first random access position to switch from the second view to the first view.

In some embodiments the computer program comprises instructions causing, when executed on at least one processor, the at least one apparatus to capture pictures of the first sequence by a first camera and to capture the second sequence by a second camera.

An apparatus according to some example embodiments comprises:

an encoding element configured for encoding a first picture from a first sequence and a second picture from a second sequence into a first access unit of at least one bitstream;

a determinator configured for determining a random access position for the at least one bitstream; and said encoding element further configured for encoding a third picture from the first sequence and a fourth picture from the second sequence into a second access unit of the at least one bitstream, the second access unit following the random access position, the third picture being intra coded and the fourth picture being predicted from the second picture.

An apparatus according to some example embodiments comprises:

a determinator configured for concluding a first random access position from at least one bitstream, the first random access position being followed by a first coded picture from a first view and a second coded picture from a second view, the first coded picture being intra coded and the second coded picture being predicted from a picture prior to the random access position;

an element configured for starting the decoding from the first random access position;

a decoding element configured for decoding the first coded picture and one or more subsequent coded pictures from the first view.

An apparatus according to some example embodiments comprises:

means for encoding a first picture from a first sequence and a second picture from a second sequence into a first access unit of at least one bitstream;

means for determining a random access position for the at least one bitstream; and means for encoding a third picture from the first sequence and a fourth picture from the second sequence into a second access unit of the at least one bitstream, the second access unit following the random access position, the third picture being intra coded and the fourth picture being predicted from the second picture.

An apparatus according to some example embodiments comprises:

means for concluding a first random access position from at least one bitstream, the first random access position being followed by a first coded picture from a first view and a second coded picture from a second view, the first coded picture being intra coded and the second coded picture being predicted from a picture prior to the random access position, and the first coded picture and the second coded picture representing a first moment of time;

means for starting the decoding from the first random access position;

means for decoding the first coded picture;

means for decoding one or more subsequent coded pictures from the first view.

We claim:

1. A method comprising:

determining a first view which is correctly decodable when starting at a random access position of at least one bitstream relative to a second view for which decoding is omitted when starting at the random access position;

encoding a first picture from a first sequence representing the first view and a second picture from a second sequence representing the second view into a first access unit at the random access position of the at least one bitstream;

encoding an indication of the random access position and an indication of the first view that is decodable when decoding is started at the random access position into the at least one bitstream;

encoding into the at least one bitstream an indication of a change of an inter-view prediction dependency order between a first inter-view prediction order and a second inter-view prediction order in order to alter a view from among a plurality of views that serves as a base view in accordance with the access unit being coded, wherein the first inter-view prediction order indicates a prediction of the first view from the second view in the first access unit and the second inter-view prediction order indicates a prediction of the second view from the first view; and encoding a third picture from the first sequence and a fourth picture from the second sequence into a second access unit of the at least one bitstream, the second access unit following the random access position, the third picture being intra coded and the fourth picture being predicted from the second picture.

2. The method according to claim 1 further comprising:
encoding a fifth picture from a third sequence into the first access unit wherein the third sequence represents a third view; and
encoding a sixth picture from the third sequence into the second access unit using prediction from the third picture.

3. An apparatus comprising at least one processor, and at least one memory including computer program code, the at least one memory and the computer program code configured to, with the at least one processor, cause the apparatus to:
determine a first view which is correctly decodable when starting at a random access position of at least one bitstream relative to a second view for which decoding is omitted when starting at the random access position;
encode a first picture from a first sequence representing the first view and a second picture from a second sequence representing the second view into a first access unit at the random access position of the at least one bitstream;
encode an indication of the random access position and an indication of the first view that is decodable when decoding is started at the random access position into the at least one bitstream;
encode into the at least one bitstream an indication of a change of an inter-view prediction dependency order between a first inter-view prediction order and a second inter-view prediction order in order to alter a view from among a plurality of views that serves as a base view in accordance with the access unit being coded, wherein the first inter-view prediction order indicates a prediction of the first view from the second view in the first access unit and the second inter-view prediction order indicates a prediction of the second view from the first view; and
encode a third picture from the first sequence and a fourth picture from the second sequence into a second access unit of the at least one bitstream, the second access unit following the random access position, the third picture being intra coded and the fourth picture being predicted from the second picture.

4. The apparatus according to claim 3, said at least one memory includes computer program code, the at least one memory and the computer program code being configured to, with the at least one processor, cause the apparatus to use prediction to:
encode a fifth picture from a third sequence into the first access unit wherein the third sequence represents a third view; and
encode a sixth picture from the third sequence into the second access unit using prediction from the third picture.

5. The apparatus according to claim 3, wherein the apparatus is an encoder, a wireless communication device, or a server.

6. A computer program embodied on a non-transitory computer readable medium, the computer program comprising instructions causing, when executed on at least one processor, at least one apparatus to:
determine a first view which is correctly decodable when starting at a random access position of at least one bitstream relative to a second view for which decoding is omitted when starting at the random access position;
encode a first picture from a first sequence representing the first view and a second picture from a second sequence representing the second view into a first access unit at the random access position of the at least one bitstream;
encode an indication of the random access position and an indication of the first view that is decodable when decoding is started at the random access position into the at least one bitstream;
encode into the at least one bitstream an indication of a change of an inter-view prediction dependency order between a first inter-view prediction order and a second inter-view prediction order in order to alter a view from among a plurality of views that serves as a base view in accordance with the access unit being coded, wherein the first inter-view prediction order indicates a prediction of the first view from the second view in the first access unit and the second inter-view prediction order indicates a prediction of the second view from the first view; and
encode a third picture from the first sequence and a fourth picture from the second sequence into a second access unit of the at least one bitstream, the second access unit following the random access position, the third picture being intra coded and the fourth picture being predicted from the second picture.

7. A method comprising:
concluding a first random access position from at least one bitstream based upon an indication encoded into the at least one bitstream and determining a first view that is correctly decodable when decoding is started at the first random access position based upon the indication encoded into the at least one bitstream, the first random access position being followed by a first access unit comprising a first coded picture from the first view and a second coded picture from a second view, the first coded picture being intra coded and the second coded picture being predicted from a picture preceding the first random access position;
starting the decoding from the first random access position;
decoding the first coded picture; and
decoding one or more subsequent coded pictures from the first view,
wherein the first coded picture and the one or more subsequent coded pictures from the first view are decoded while the second coded picture from the second view is omitted from decoding when starting the decoding from the first random access position,
wherein a first inter-view prediction order indicates a prediction of the first view from the second view in the first access unit and a second inter-view prediction order indicates a prediction of the second view from the first view, and wherein the method further comprises decoding an indication of a change of the inter-view prediction dependency order between the first inter-view prediction order and the second inter-view prediction order from the at least one bitstream in order to alter a view from among a plurality of views that serves as a base view in accordance with the access unit being decoded.

8. The method according to claim 7 comprising:
concluding a second random access position from the at least one bitstream, the second random access position being followed by a second access unit comprising a third coded picture from the first view and a fourth coded picture from the second view, the fourth coded picture being intra coded;
decoding the third coded picture; and
decoding the fourth coded picture.

9. An apparatus comprising at least one processor, memory including computer program code, the memory and the computer program code configured to, with the at least one processor, cause the apparatus to:
conclude a first random access position from at least one bitstream based upon an indication encoded into the at least one bitstream and determine a first view that is correctly decodable when decoding is started at the first random access position based upon the indication encoded into the at least one bitstream, the first random access position being followed by a first access unit comprising a first coded picture from the first view and a second coded picture from a second view, the first coded picture being intra coded and the second coded picture being predicted from a picture preceding the first random access position;
start the decoding from the first random access position;
decode the first coded picture; and
decode one or more subsequent coded pictures from the first view,
wherein the first coded picture and the one or more subsequent coded pictures from the first view are decoded while the second coded picture from the second view is omitted from decoding when starting the decoding from the first random access position,
wherein a first inter-view prediction order indicates a prediction of the first view from the second view in the first access unit and a second inter-view prediction order indicates a prediction of the second view from the first view, and wherein the memory and the computer program code are further configured to, with the at least one processor, cause the apparatus to decode an indication of a change of the inter-view prediction dependency order between the first inter-view prediction order and the second inter-view prediction order from the at least one bitstream in order to alter a view from among a plurality of views that serves as a base view in accordance with the access unit being decoded.

10. The apparatus according to claim 9, said at least one memory including computer program code, the at least one memory and the computer program code being configured to, with the at least one processor, cause the apparatus to
conclude a second random access position from the at least one bitstream, the second random access position being followed by a second access unit comprising a third coded picture from the first view and a fourth coded picture from the second view, the fourth coded picture being intra coded;
decode the third coded picture; and
decode the fourth coded picture.

11. The apparatus according to claim 9, wherein the apparatus is a decoder, a wireless communication device, or a client device.

12. A computer program embodied on a non-transitory computer readable medium, the computer program comprising instructions causing, when executed on at least one processor, at least one apparatus to:
conclude a first random access position from at least one bitstream based upon an indication encoded into the at least one bitstream and determine a first view that is correctly decodable when decoding is started at the first random access position based upon the indication encoded into the at least one bitstream, the first random access position being followed by a first access unit comprising a first coded picture from the first view and a second coded picture from a second view, the first coded picture being intra coded and the second coded picture being predicted from a picture preceding the first random access position;
start the decoding from the first random access position;
decode the first coded picture; and
decode one or more subsequent coded pictures from the first view,
wherein the first coded picture and the one or more subsequent coded pictures from the first view are decoded while the second coded picture from the second view is omitted from decoding when starting the decoding from the first random access position,
wherein a first inter-view prediction order indicates a prediction of the first view from the second view in the first access unit and a second inter-view prediction order indicates a prediction of the second view from the first view, and wherein the computer program further comprising instructions causing, when executed on the at least one processor, the at least one apparatus to decode an indication of a change of the inter-view prediction dependency order between the first inter-view prediction order and the second inter-view prediction order from the at least one bitstream in order to alter a view from among a plurality of views that serves as a base view in accordance with the access unit being decoded.

13. The computer program according to claim 12 comprising instructions causing, when executed on at least one processor, the at least one apparatus to
conclude a second random access position from the at least one bitstream, the second random access position being followed by a second access unit comprising a third coded picture from the first view and a fourth coded picture from the second view, the fourth coded picture being intra coded;
decode the third coded picture; and
decode the fourth coded picture.

14. An apparatus comprising:
means for determining a first view which is correctly decodable when starting at a random access position of at least one bitstream relative to a second view for which decoding is omitted when starting at the random access position;
means for encoding a first picture from a first sequence representing the first view and a second picture from a second sequence representing the second view into a first access unit of the at least one bitstream;
means for encoding an indication of the random access position and an indication of the first view that is decodable when decoding is started at the random access position into the at least one bitstream;
means for encoding into the at least one bitstream an indication of a change of an interview prediction dependency order between a first inter-view prediction order and a second interview prediction order in order to alter a view from among a plurality of views that serves as a base view in accordance with the access unit being coded, wherein the first inter-view prediction order indicates a prediction of the first view from the second view in the first access unit and the second inter-view prediction order indicates a prediction of the second view from the first view; and means for encoding a third picture from the first sequence and a fourth picture from the second sequence into a second access unit of the at least one bitstream, the second access unit following the random access position, the third picture being intra coded and the fourth picture being predicted from the second picture.

15. An apparatus comprising:

means for concluding a first random access position from at least one bitstream based upon an indication encoded into the at least one bitstream and means for determining a first view that is correctly decodable when decoding is started at the first random access position based upon the indication encoded into the at least one bitstream, the first random access position being followed by a first access unit comprising a first coded picture from the first view and a second coded picture from a second view, the first coded picture being intra coded and the second coded picture being predicted from a picture prior to the first random access position, and the first coded picture and the second coded picture representing a first moment of time;

means for starting the decoding from the first random access position;

means for decoding the first coded picture; and means for decoding one or more subsequent coded pictures from the first view, wherein the first coded picture and the one or more subsequent coded pictures from the first view are decoded while the second coded picture from the second view is omitted from decoding when starting the decoding from the first random access position, wherein a first inter-view prediction order indicates a prediction of the first view from the second view in the first access unit and a second inter-view prediction order indicates a prediction of the second view from the first view, and wherein the apparatus further comprises means for decoding an indication of a change of the inter-view prediction dependency order between the first inter-view prediction order and the second inter-view prediction order from the at least one bitstream in order to alter a view from among a plurality of views that serves as a base view in accordance with the access unit being decoded.

* * * * *